US012794536B2

(12) United States Patent
Li

(10) Patent No.: US 12,794,536 B2
(45) Date of Patent: Nov. 10, 2026

(54) METHOD AND DEVICE FOR TRANSMITTING INFORMATION, AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 31 days.

(21) Appl. No.: 18/845,761

(22) PCT Filed: Mar. 11, 2022

(86) PCT No.: PCT/CN2022/080451
§ 371 (c)(1),
(2) Date: Sep. 10, 2024

(87) PCT Pub. No.: WO2023/168710
PCT Pub. Date: Sep. 14, 2023

(65) Prior Publication Data

US 2025/0192862 A1 Jun. 12, 2025

(51) Int. Cl.

| | |
|---|---|
| ***H04L 5/12*** | (2006.01) |
| ***H04B 7/06*** | (2006.01) |
| ***H04L 5/00*** | (2006.01) |
| ***H04W 24/10*** | (2009.01) |
| ***H04W 72/044*** | (2023.01) |
| ***H04W 72/51*** | (2023.01) |

(52) U.S. Cl.
CPC ....... *H04B 7/06952* (2023.05); *H04L 5/0048* (2013.01); *H04W 24/10* (2013.01); *H04W 72/046* (2013.01); *H04W 72/51* (2023.01)

(58) Field of Classification Search
CPC .. H04B 7/06952; H04W 72/51; H04W 24/10; H04W 72/046; H04L 5/0048
USPC ................ 375/262, 260, 259, 219, 295, 316
See application file for complete search history.

(56) References Cited

U.S. PATENT DOCUMENTS

2021/0399783 A1* 12/2021 Onggosanusi ..... H04B 7/06966
2021/0409989 A1 12/2021 Raghavan et al.
2023/0086334 A1* 3/2023 Chen .................... H04B 7/0617 375/267
2023/0275726 A1* 8/2023 Lee ....................... H04L 5/0051 370/329

FOREIGN PATENT DOCUMENTS

| | | | |
|---|---|---|---|
| CN | 110114985 | A | 8/2019 |
| CN | 110912665 | A | 3/2020 |
| CN | 111162827 | A | 5/2020 |
| CN | 112671444 | A | 4/2021 |
| CN | 112994761 | A | 6/2021 |
| CN | 113163438 | A | 7/2021 |
| CN | 113923709 | A | 1/2022 |
| CN | 113973363 | A | 1/2022 |

* cited by examiner

*Primary Examiner* — Zewdu A Kassa
(74) *Attorney, Agent, or Firm* — Volpe Koenig

(57) ABSTRACT

A method and device for transmitting information and a storage medium are provided, which relate to the field of mobile communications. The method, which is performed by a network device, includes: receiving beam information of at least one receiving beam transmitted by a terminal.

18 Claims, 4 Drawing Sheets

METHOD AND DEVICE FOR TRANSMITTING INFORMATION, AND STORAGE MEDIUM

CROSS-REFERENCE TO RELATED APPLICATIONS

The present application is a U.S. National Stage of International Application No. PCT/CN2022/080451, filed on Mar. 11, 2022, the contents of all of which are incorporated herein by reference in their entirety for all purposes.

BACKGROUND OF THE INVENTION

In a mobile communication system, a network device configures reference signal resources of beam measurement for the terminal, and the terminal uses different receiving beams to scan and measure the reference signals.

SUMMARY OF THE INVENTION

The present disclosure relates to the field of mobile communication, in particular to a method and device for transmitting information, a device, and a storage medium. A method and device for transmitting information, a device, and a storage medium are provided according to embodiments of the present disclosure. A network device determines the signal quality of a reference signal according to at least one receiving beam of a terminal, which improves the accuracy of the determined signal quality, thereby enhancing the reliability of communication. The technical solutions are as follows.

According to an aspect of the present disclosure, a method for transmitting information is provided. The method is performed by a network device, and the method includes: receiving beam information of at least one receiving beam transmitted by a terminal.

According to an aspect of the present disclosure, a method for transmitting information is provided. The method for transmitting information is performed by a terminal, and the method includes: transmitting beam information of at least one receiving beam to a network device.

According to an aspect of the present disclosure, a terminal is provided. The terminal includes: a processor; a transceiver, connected to the processor; and a memory, configured to store executable instructions of the processor, where the processor is configured to load and execute the executable instructions, to implement the method for transmitting information of the aspect described above.

According to an aspect of the present disclosure, a network device is provided. The network device includes: a processor; a transceiver, connected to the processor; and a memory, configured to store executable instructions of the processor, where the processor is configured to load and execute the executable instructions, to implement the method for transmitting information of the aspect described above.

According to an aspect of the present disclosure, a non-transitory computer-readable storage medium is provided. The non-transitory computer-readable storage medium stores executable program codes, where the executable program codes are loaded and executed by a processor, to implement the method for transmitting information of the aspect described above.

BRIEF DESCRIPTION OF DRAWINGS

To describe technical solutions of embodiments of the present disclosure more clearly, accompanying drawings used by description of the embodiments will be briefly described below. It is apparent that the accompanying drawings in the following description are merely some examples of the present disclosure. A person of ordinary skill in the art can still obtain other accompanying drawings from these accompanying drawings without creative efforts.

DETAILED DESCRIPTION OF THE INVENTION

Figure 1:
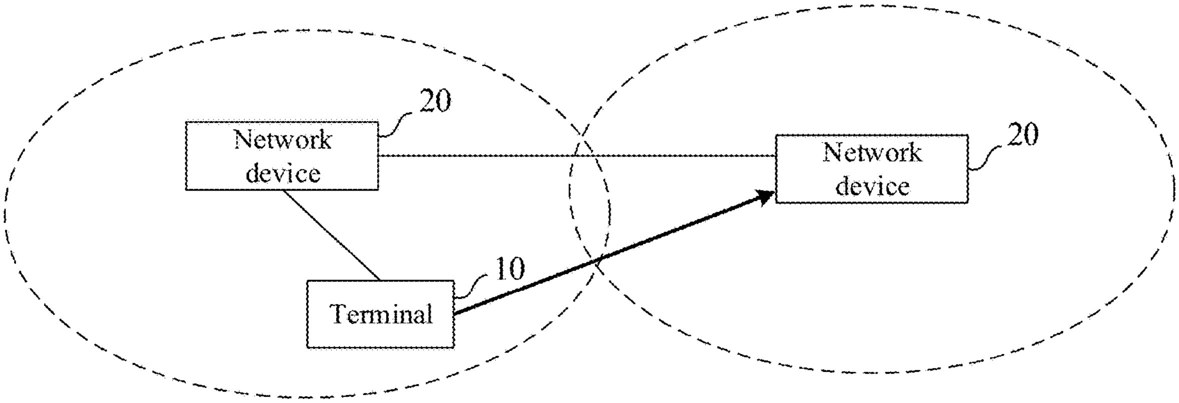
FIG. 1 is a block diagram of a communication system according to an example of the present disclosure.

To make the objectives, technical solutions, and advantages of the present application clearer, the embodiments of the present application will be described in further detail with reference to the accompanying drawings below.

Examples will be described in detail here, instances of which are illustrated in the accompanying drawings. When the following description relates to the accompanying drawings, the same numbers in different accompanying drawings refer to the same or similar elements unless otherwise indicated. The embodiments described in the following examples do not represent all embodiments consistent with the examples of the present disclosure. Rather, they are merely instances of devices and methods consistent with some aspects of the appended claims of the present disclosure.

The terms used in the examples of the present disclosure is for the purpose of describing particular embodiments merely and are not intended to limit the examples of the present disclosure. As used in the examples of the present disclosure, singular forms "a," "an," and "the/said" are intended to include plural forms as well, unless otherwise indicated in the context clearly. It should be understood that the term "and/or" as used here refers to and encompasses any or all possible combinations of at least one of the associated listed items.

It should be understood that although the terms "first," "second," "third," and the like may be used in the examples of the present disclosure to describe various information, such information should not be limited to these terms. These terms are merely used to distinguish the same type of information from each other. For example, first information may also be referred to as second information, and similarly, second information may also be referred to as first information, without departing from the scope of the examples of the present disclosure. The word "if" as used here may be construed to mean "at the time of," or "when," or "in response to determining," depending on the context.

It should be noted that information (including but not limited to user device information and user personal information, etc.), data (including but not limited to data for analysis, data stored and data displayed) and signals that are involved in the present disclosure are all authorized by a user or fully authorized by all parties, and the collection, use and processing of relevant data should comply with relevant laws, regulations and standards in relevant countries and regions.

In the related art, the terminal then feeds back to the network device the reference signal quality measured through at least one receiving beam and the corresponding reference signal identity (ID). This allows the network device to determine the reference signal quality of other reference signals based on the received reference signal quality of at least one receiving beam, the corresponding reference signal ID, and a signal quality prediction model. However, the accuracy of the reference signal quality determined using the above method is far from satisfactory.

An application scenario of the present disclosure will be described below.

FIG. 1 illustrates a block diagram of a communication system according to an example of the present disclosure. The communication system may include a terminal 10 and a network device 20.

A plurality of terminals 10 are usually provided, and one or more terminals 10 may be distributed in a cell managed by one network device 20. The terminal 10 may include various handheld devices, vehicle-mounted devices, wearable devices, and computing devices that have a radio communication function, other processing devices connected to a wireless modem, and various forms of user equipment (UE) and mobile stations (MS). For convenience of description, in the example of the present disclosure, the devices described above are collectively referred to as the terminal.

The network device 20 is a device deployed in the access network to provide wireless communication functions for the terminal 10. For ease of description, in the embodiments of the present disclosure, the device that provides wireless communication functions for the terminal 10 is collectively referred to as a network device. A connection can be established between the network device 20 and the terminal 10 via the air interface, allowing for communication through this connection, including the exchange of signaling and data. There may be a plurality of network devices 20, and two adjacent network devices 20 may communicate with each other via either a wired or wireless manner. The terminal 10 may switch between different network devices 20, i.e., it may establish connections with different network devices 20.

The network device 20 may include various forms of macro base stations, micro base stations, relay stations, access points, etc. In systems that use different radio access technologies, the names of devices that have network device functions may be different, for example, gNodeB or gNB in a 5G new radio (NR) system. With the evolution of communication technology, the name "network device" may change. A gNB may include one or more transmission reception points (TRPs), or a gNB may include one or more antenna panels.

Figure 2:
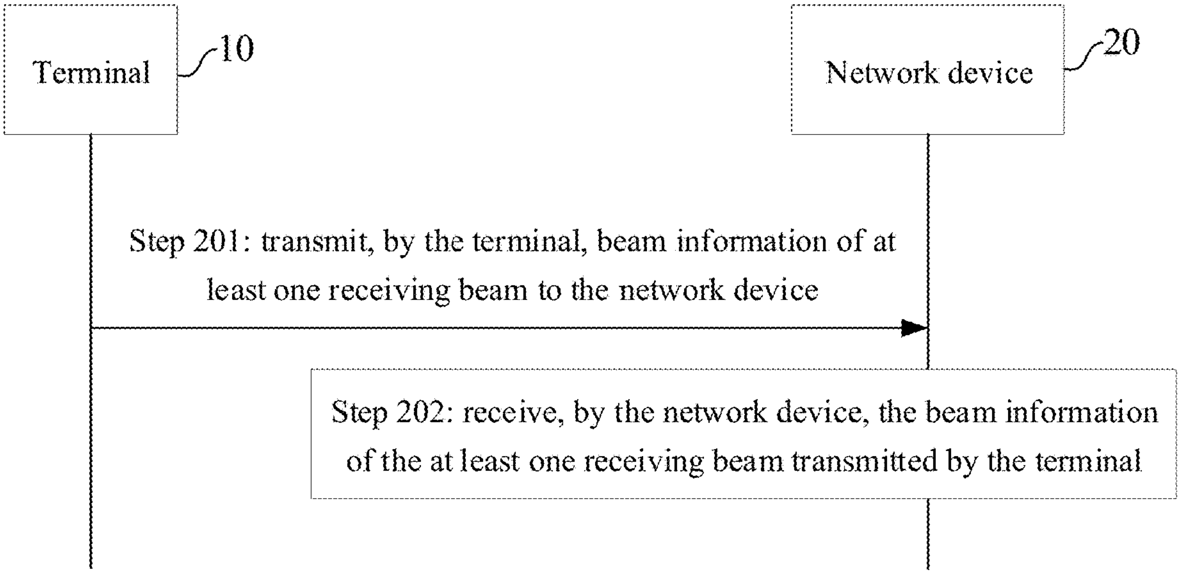
FIG. 2 is a flowchart of a method for transmitting information according to an example of the present disclosure.

FIG. 2 illustrates a flowchart of a method for transmitting information according to an example of the present disclosure. For example, the method may be performed by the terminal 10, and the network device 20 shown in FIG. 1, and the method includes at least a part of the following.

Step 201: beam information of at least one receiving beam is transmitted to the network device by the terminal.

In an embodiment of the present disclosure, the terminal includes at least one receiving beam and communicates with the network device through the at least one receiving beam. In addition, the beam information of the at least one receiving beam may be further obtained by the terminal, and the beam information of the at least one receiving beam may be further transmitted to the network device by the terminal.

The terminal measures reference signals based on reference signal resources configured by the network device, to determine the reference signal quality of reference signals transmitted by the network device. When these reference signals are measured by the terminal, the reference signal quality of the reference signal may be measured by the terminal with receiving beams of the at least one receiving beam of the terminal for each reference signal. After the measurement, the beam information of these receiving beams may be further reported by the terminal, and then the beam information of the receiving beams that is reported by the terminal is received by the network device.

In some examples, the reference signal resource configured for the terminal by the network device is a channel state information reference signal (CSI-RS) resource, or the reference signal resource is a synchronization signal block (SSB) resource. Accordingly, the reference signal transmitted to the terminal by the network device is the CSI-RS signal in a case where the reference signal resource configured for the terminal by the network device is the CSI-RS resource; and the reference signal transmitted to the terminal by the network device is the SSB in a case where the reference signal resource configured for the terminal by the network device is the SSB resource, which is not limited to the example of the present disclosure.

Step 202: the beam information of the at least one receiving beam transmitted by the terminal is received by the network device.

In the example of the present disclosure, the beam information of the at least one receiving beam transmitted by the terminal is received by the network device, and each receiving beam of the at least one receiving beam of the terminal may be determined. Then, the reference signal quality corresponding to other reference signals may be subsequently determined based on the reference signal quality and corresponding beam information that are reported by the terminal.

It should be noted that the steps performed by the terminal in the example of the present disclosure may be implemented separately to form a new example, and the steps performed by the network device may be implemented separately to form a new example.

In the solution according to the embodiment of the present disclosure, the beam information of the at least one receiving beam is reported to the network device by the terminal, so that the at least one receiving beam of the terminal is determined by the network device. In this way, the signal quality of the reference signal is determined by the network device according to the at least one receiving beam of the terminal, thereby improving the accuracy of the determined signal quality, and, consequently, enhancing the reliability of the communication.

Figure 3:
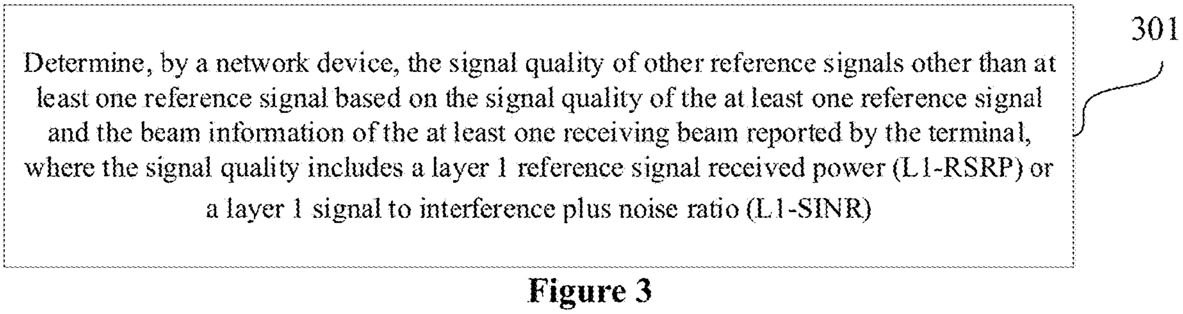
FIG. 3 is a flowchart of a method for transmitting information according to an example of the present disclosure.

Based on the example shown in FIG. 2, the signal quality of other reference signals may be determined by the network device based on the information of the reference signal(s) reported by the terminal. FIG. 3 illustrates a flowchart of a method for transmitting information according to an example of the present disclosure. With reference to FIG. 3, the method includes step 301.

Step 301: signal quality of other reference signals other than at least one reference signal are determined by the network device based on signal quality of the at least one reference signal and beam information of at least one receiving beam that are reported by a terminal, where the signal quality includes a layer 1 reference signal received power (L1-RSRP) or a layer 1 signal to interference plus noise ratio (L1-SINR). The at least one reference signal includes one or more reference signals.

In the example of the present disclosure, the network device may determine the at least one receiving beam reported by the terminal according to the beam information of the at least one receiving beam. In a case where the signal quality of the reference signal received by using the at least one receiving beam and the beam information of the at least one receiving beam are reported by the terminal, the network device may determine the signal quality of other reference signals other than the at least one reference signal according to the determined at least one receiving beam and the signal quality of the reference signal received through the at least one receiving beam.

The receiving beam refers to a beam used by the terminal, i.e., the beam configured to measure the signal quality of the reference signal transmitted by the network device. The reference signal may also be transmitted by the network device through a transmitting beam of the network device, and the reference signal transmitted by the network device is received by the terminal through the receiving beam.

Optionally, the signal quality of the reference signal received by using the at least one receiving beam is required to be reported by the terminal. Before reporting, the terminal randomly selects a portion of receiving beams to measure the signal quality of the reference signal and reports the measured signal quality of the reference signal to the network device.

Optionally, the terminal randomly selects a portion of receiving beams to measure the signal quality of the reference signal. Further, the terminal randomly selects a preset number of reference signals with higher signal quality and reports the signal quality of the selected reference signals to the network device.

In some examples, different reference signals are transmitted by the network device, and each reference signal transmitted by the network device is received by the terminal using the at least one receiving beam of the terminal itself.

Figure 4:
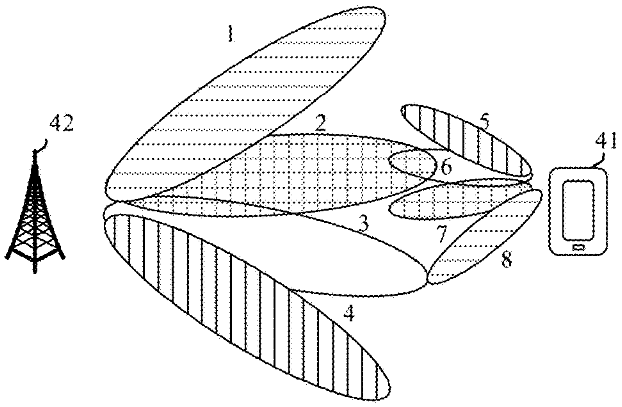
FIG. 4 is a structural diagram of beams between a network device and a terminal according to an example of the present disclosure.

For example, as shown in FIG. 4, a reference signal 1, a reference signal 2, a reference signal 3, and a reference signal 4 are transmitted by the network device 42, and the terminal 41 includes a receiving beam 5, a receiving beam 6, a receiving beam 7, and a receiving beam 8. The reference signals transmitted by the network device 42 are received by the terminal 41 through the receiving beam 5, the receiving beam 6, the receiving beam 7, and the receiving beam 8, respectively. In other words, the reference signal 1, the reference signal 2, the reference signal 3 and the reference signal 4 that are transmitted by the network device 42 may be received by the terminal through the receiving beam 5, and the reference signal 1, the reference signal 2, the reference signal 3 and the reference signal 4 that are transmitted by the network device 42 may also be received by the terminal through the receiving beam 6, and so on. The reference signal 1, the reference signal 2, the reference signal 3, and the reference signal 4 that are transmitted by the network device 42 may be received by each receiving beam of the terminal. In addition, the signal quality of each reference signal received by each receiving beam is measured by each receiving beam of the terminal. In this case, all combinations of the reference signals and the receiving beams are measured by the terminal 41. In different embodiments, a part of all the combinations of the reference signals and the receiving beams may be measured by the terminal 41. After the signal quality of the reference signal is measured, an identifier of the reference signal, signal quality corresponding to the identifier of the reference signal, and beam information of the receiving beam that obtains the signal quality corresponding to the identifier of the reference signal may be reported by the terminal 41. The combinations of the reference signals and the receiving beams that are reported by the terminal 41 may include all combinations and signal quality corresponding to each of the combinations, or a portion of all combinations and signal quality corresponding to each of the portion combinations.

For example, as shown in FIG. 4, the reference signal 1, the reference signal 2, the reference signal 3, and the reference signal 4 are transmitted by the network device 42, and the terminal 41 includes the receiving beam 5, the receiving beam 6, the receiving beam 7, and the receiving beam 8. At least one reference signal of the four reference signals transmitted by the network device 42 may be received by the terminal 41 through each receiving beam of the four receiving beams. For example, the reference signal 1 transmitted by the network device 42 is received by the terminal 41 through the receiving beam 5. The reference signal 2 transmitted by the network device 42 is received by the terminal through the receiving beam 6. The reference signal 3 transmitted by the network device 42 is received by the terminal through the receiving beam 7. And the reference signal 4 transmitted by the network device 42 is received by the terminal through the receiving beam 8. In other words, each receiving beam is configured to receive and measure at least one reference signal. In addition, an identifier of at least one reference signal measured by each receiving beam, signal quality corresponding to the identifier of the reference signal, and information of the receiving beam that obtains the signal quality corresponding to the identifier of the reference signal are reported. For example, the reference signal 1 and the receiving beam 5, and the signal quality of the corresponding reference signal 1 are reported. The reference signal 2 and the receiving beam 6, and the signal quality of the corresponding reference signal 2 are reported. The reference signal 3 and the receiving beam 7, and the signal quality of the corresponding reference signal 3 are reported. The reference signal 4 and the receiving beam 8, and the signal quality of the corresponding reference signal 4 are reported.

The signal quality of the reference signal received by the terminal through the at least one receiving beam refers to the measurement for the L1-RSRP of the reference signal or the L1-SINR of the reference signal.

In some embodiments, after receiving the identifier of the reference signal, the information of the receiving beam, and the signal quality of the identifier of the reference signal that are reported by the terminal device, the network device sorts the signal quality of the at least one reference signal according to the identifier of the receiving beam and/or the identifier of the reference signal, and determines the signal quality of other reference signals based on the sorted signal quality of the reference signals and a signal quality prediction model.

Since the identifier of the at least one reference signal, the signal quality of the reference signal, and information of the corresponding receiving beam are obtained by the network device, the network device can determine the receiving beam through which the terminal receives the at least one reference signal and the signal quality of each reference signal. In this way, while determining the signal quality of other reference signals, the network device can sort the reported signal quality of the reference signal(s) based on the beam information of the receiving beam(s) reported by the terminal, to obtain the signal quality of the other reference signals.

It should be noted that the signal quality prediction model in the embodiment of the present disclosure is pre-stored in the network device. Alternatively, the signal quality prediction model in the embodiment of the present disclosure is stored in a server and is transmitted to the network device by the server. Then, the signal quality of the reference signal is predicted by the network device based on the signal quality prediction model.

For the process of determining the signal quality of the other reference signals by the network device via the signal quality prediction model, the network device may sort the reported signal quality of the reference signals according to the identifier of the receiving beam of the terminal and/or the identifier of the reference signal. For the reported signal quality of the reference signal, each reported signal quality of the reference signal corresponds to the identifier of the receiving beam of the terminal and the identifier of the reference signal, and the signal quality of other reference signals may be predicted by the signal quality prediction model. The predicted signal quality of the other reference signals may include signal quality corresponding to all combinations of receiving beams and reference signals of the corresponding terminal, or signal quality corresponding to some combinations of receiving beams and reference signals of the corresponding terminal. For example, the obtained strongest signal quality of each reference signal may be predicted when all receiving beams are used to receive the reference signals.

In the embodiment of the present disclosure, each receiving beam of the terminal corresponds to an identifier. When the signal quality of the other reference signals is determined based on the at least one receiving beam and the signal quality of the reference signal received through the receiving beam, the network device sorts the reported signal quality of the reference signals according to the identifier(s) of the receiving beam(s). Alternatively, the network device sorts the reported signal quality of the reference signals according to the identifier(s) of the reference signal(s). Alternatively, the network device sorts the reported signal quality of the reference signals according to the identifier(s) of the receiving beam(s) and the identifier(s) of the reference signal(s). Then, the sorted signal quality of the reference signals is input into the signal quality prediction model to determine the signal quality of the other reference signals other than these reference signals.

The signal quality prediction model is configured to predict the signal quality of the reference signals received by all receiving beams, according to the signal quality of the reference signals received by some receiving beams and corresponding beam information of the receiving beams.

For example, according to the identifier of the receiving beam of the terminal, the signal quality of the at least one reference signal is sorted to obtain the sorted matrix sequence. The matrix sequence is input into the signal quality prediction model to obtain the signal quality of the other reference signals other than the at least one reference signal. Alternatively, according to the identifier of the reference signal, the signal quality of the at least one reference signal is sorted to obtain the sorted matrix sequence. The matrix sequence is input into the signal quality prediction model to obtain the signal quality of the other reference signals other than the at least one reference signal. Alternatively, according to the identifier of the receiving beam of the terminal and the identifier of the reference signal, the signal quality of the at least one reference signal is sorted to obtain the sorted matrix sequence. The sorted matrix sequence is input into the signal quality prediction model to obtain the signal quality of the other reference signals other than the at least one reference signal.

It should be noted that in the embodiment of the present disclosure, when sorting the signal quality of the at least one reference signal, the signal quality of a reference signal is set as 0 in a case where the signal quality of the reference signal is not measured.

For example, when the signal quality of the reference signals is sorted according to the identifier of the receiving beam and the identifier of the reference signal, the terminal has two receiving beams and four reference signals are transmitted by a base station, the matrix sequence input into the signal quality prediction model includes eight parameters. The eight parameters constitute a matrix sequence with one column and eight rows, that is, the receiving beam 1 of the terminal and the signal quality corresponding to the reference signal 1 of the base station, the receiving beam 1 of the terminal and the signal quality corresponding to the reference signal 2 of the base station, the receiving beam 1 of the terminal and the signal quality corresponding to the reference signal 3 of the base station, the receiving beam 1 of the terminal and the signal quality corresponding to the reference signal 4 of the base station, the receiving beam 2 of the terminal and the signal quality corresponding to the reference signal 1 of the base station, the receiving beam 2 of the terminal and the signal quality corresponding to the reference signal 2 of the base station, the receiving beam 2 of the terminal and the signal quality corresponding to the reference signal 3 of the base station, and the receiving beam 2 of the terminal and the signal quality corresponding to the reference signal 4 of the base station.

For the matrix input to the signal quality prediction model, the 8 signal qualities in the matrix are set as follows: for the reference signal and receiving beam combinations for which the terminal has reported the signal quality, the corresponding parameters in the matrix are set to the signal quality of those reference signals. For the reference signal and receiving beam combinations for which the terminal has not reported the signal quality, the corresponding parameters in the matrix are set to 0. Subsequently, the signal quality prediction model processes the input matrix and obtains an output matrix, from which the signal quality of all reference signals can be determined.

For example, after the signal quality of the reference signals is sorted by the network device according to the identifier of the receiving beam and the identifier of the reference signal, the matrix obtained is as follows:

$$\begin{bmatrix} RSRP\#1 \\ RSRP\#2 \\ RSRP\#3 \\ RSRP\#4 \\ RSRP\#5 \\ RSRP\#6 \\ RSRP\#7 \\ RSRP\#8 \end{bmatrix} = \begin{bmatrix} 0 \\ RSRP\#2 \\ 0 \\ 0 \\ RSRP\#5 \\ 0 \\ RSRP\#7 \\ RSRP\#8 \end{bmatrix}$$

The obtained matrix is input into the signal quality prediction model, and based on the signal quality prediction model, the processed matrix is output as follows:

$$\begin{bmatrix} RSRP\#1 \\ RSRP\#2 \\ RSRP\#3 \\ RSRP\#4 \\ RSRP\#5 \\ RSRP\#6 \\ RSRP\#7 \\ RSRP\#8 \end{bmatrix}$$

The matrix may denote the signal quality of the reference signals.

In the solution according to the example of the present disclosure, after the signal quality of the reference signals is sorted according to the identifier of the reference signal and/or the identifier of the receiving beam of the terminal, the signal quality of the other reference signals is determined according to the sorted signal quality of the reference signals and the signal quality prediction model. Since the signal quality of the other reference signals can be determined by the signal quality prediction model according to the signal quality of some of the reference signals and the beam information of the corresponding receiving beams, the accuracy of the signal quality determined is improved.

In some examples, the signal quality of the at least one reference signal is grouped by the network device according to the identifier of the receiving beam of the terminal and/or the identifier of the reference signal. Based on the signal quality of the reference signals that are grouped and the signal quality prediction model, the signal quality of other reference signals with the same beam information as the receiving beam corresponding to the at least one reference signal is determined.

In the embodiment of the present disclosure, each receiving beam corresponds to an identifier. When determining the signal quality of the other reference signals, the signal quality of reference signals received through these receiving beams is first grouped according to the identifier of the receiving beam, to obtain the signal quality of the reference signals in different groups. Then, the signal quality of the other reference signals with the same beam information as the receiving beam corresponding to the at least one reference signal is determined according to the grouped signal quality of the reference signals and the signal quality prediction model. Alternatively, when determining the signal quality of the other reference signals, the signal quality of reference signals that are received through these receiving beams is first grouped according to the identifier of the reference signal, to obtain the signal quality of the reference signals in different groups. Then, the signal quality of the other reference signals with the same identifier as the reference signal corresponding to the at least one reference signal is determined according to the grouped signal quality of the reference signals and the signal quality prediction model.

For example, a description is made with an example of grouping the signal quality according to the identifier of the receiving beam. In a case where there are eight signal quality, i.e., the receiving beam 1 of the terminal and the signal quality corresponding to the reference signal 1 of the base station, the receiving beam 1 of the terminal and the signal quality corresponding to the reference signal 2 of the base station, the receiving beam 1 of the terminal and the signal quality corresponding to the reference signal 3 of the base station, the receiving beam 1 of the terminal and the signal quality corresponding to the reference signal 4 of the base station, the receiving beam 2 of the terminal and the signal quality corresponding to the reference signal 1 of the base station, the receiving beam 2 of the terminal and the signal quality corresponding to the reference signal 2 of the base station, the receiving beam 2 of the terminal and the signal quality corresponding to the reference signal 3 of the base station, and the receiving beam 2 of the terminal and the signal quality corresponding to the reference signal 4 of the base station.

According to the solution, according to the example of the present disclosure, the signal quality belonging to the receiving beam 1 is divided into one group. In other words, the receiving beam 1 of the terminal and the signal quality corresponding to the reference signal 1 of the base station, the receiving beam 1 of the terminal and the signal quality corresponding to the reference signal 2 of the base station, the receiving beam 1 of the terminal and the signal quality corresponding to the reference signal 3 of the base station, and the receiving beam 1 of the terminal and the signal quality corresponding to the reference signal 4 of the base station are grouped into one group. The receiving beam 2 of the terminal and the signal quality corresponding to the reference signal 1 of the base station, the receiving beam 2 of the terminal and the signal quality corresponding to the reference signal 2 of the base station, the receiving beam 2 of the terminal and the signal quality corresponding to the reference signal 3 of the base station, and the receiving beam 2 of the terminal and the signal quality corresponding to the reference signal 4 of the base station are grouped into another group.

The solution for predicting the signal quality of the reference signal in the example of the present disclosure is similar to the example described above, which will not be repeated here.

In the solution according to the example of the present disclosure, the signal quality of the other reference signals may be directly determined by the network device according to the signal quality of the at least one reference signal and the beam information of the at least one receiving beam. The accuracy of the determined signal quality of the other reference signals is improved since the signal quality of the reference signal and the beam information returned by the terminal are referenced.

Based on the embodiment shown in FIG. 2, the beam information includes at least one of the following: (1)-(10).

(1) An identifier of the receiving beam.

Each receiving beam may be indicated by the identifier. For example, the identifier of the receiving beam is an identity (ID) of the receiving beam.

With reference to FIG. 4, the terminal includes four receiving beams, i.e., the receiving beam 5, the receiving beam 6, the receiving beam 7, and the receiving beam 8. In other words, the receiving beam 5, the receiving beam 6, the receiving beam 7, and the receiving beam 8 may be reported by the terminal, thereby these four receiving beams are indicated accordingly.

(2) A value of a first azimuth angle.

In the embodiment of the present disclosure, the beam information includes the first azimuth angle. The first azimuth angle indicates an azimuth angle corresponding to the receiving beam. In other words, the first azimuth angle of the receiving beams has a numerical value, and the beam information includes the first azimuth angle corresponding to each receiving beam.

(3) An identifier of the first azimuth angle.

In the example of the present disclosure, the first azimuth angle has a numerical value, and the numerical value of the first azimuth angle may be indicated by the identifier of the first azimuth angle. In other words, the identifier of the first azimuth angle has a correspondence relationship with the numerical value of the first azimuth angle, where the first azimuth angle may be determined according to the identifier of the first azimuth angle and the correspondence relationship.

It should be noted that there is an implicit correspondence relationship between the first azimuth angle and the receiving beam in the embodiment of the present disclosure. In other words, after the value of the first azimuth angle or the identifier of the first azimuth angle are reported by the terminal, the network device may determine the identifier of the corresponding receiving beam according to the value of the first azimuth angle or the identifier of the first azimuth angle. Subsequently, the network device may predict the signal quality of other reference signals according to the determined identifier of the receiving beam and the signal quality prediction model.

(4) A value of a second azimuth angle.

In the embodiment of the present disclosure, the beam information includes a second azimuth angle. The second azimuth angle indicates an azimuth angle corresponding to the receiving beam. In other words, the second azimuth angle of the receiving beams has a numerical value, and the beam information includes the second azimuth angle corresponding to each receiving beam.

(5) An identifier of the second azimuth angle.

The second azimuth angle is similar to the first azimuth angle, which will not be repeated here.

It should be noted that the first azimuth angle in the embodiment of the present disclosure is an angle in a horizontal dimension, and the second azimuth angle is an angle in a vertical dimension. Alternatively, the first azimuth angle is an angle in a vertical dimension, and the second azimuth angle is an angle in a horizontal dimension.

It should be noted that there is an implicit correspondence relationship between the second azimuth angle and the receiving beam in the embodiment of the present disclosure. In other words, after the value of the second azimuth angle or the identifier of the second azimuth angle is reported by the terminal, the network device may determine the identifier of the corresponding receiving beam according to the value of the second azimuth angle or the identifier of the second azimuth angle. Subsequently, the network device may predict the signal quality of the other reference signals according to the determined identifier of the receiving beam and the signal quality prediction model.

(6) The total number of receiving beams.

In the embodiment of the present disclosure, the terminal includes at least one receiving beam. The at least one receiving beam may include one or more receiving beams. In a case where the terminal includes a plurality of receiving beams, the total number of receiving beams is reported to the network device via the beam information. In this way, the network device may be informed of the number of receiving beams used by the terminal.

With reference to FIG. 4, the terminal includes four receiving beams, i.e., the receiving beam 5, the receiving beam 6, the receiving beam 7, and the receiving beam 8. In other words, the total number of receiving beams reported by the terminal is four.

(7) The total number of first azimuth angles.

In the embodiment of the present disclosure, the total number of first azimuth angles reported by the terminal is the number of first azimuth angles having different numerical values that are used by the terminal. The first azimuth angle is a first azimuth angle corresponding to the receiving beam of the terminal. The number of first azimuth angles used by the terminal may be reported by the terminal, so that the network device determines the number of first azimuth angles used by the terminal. In addition, the network device may further determine the numerical value of each first azimuth angle based on the total number of first azimuth angles.

In some embodiments, after the total number of first azimuth angles is determined, the numerical value of each first azimuth angle may be determined according to an angular range of the first azimuth angles and the total number of first azimuth angles.

Optionally, the total number of first azimuth angles is obtained, and then the angular range of the first azimuth angles is obtained, to determine an angular interval between two adjacent first azimuth angles, and then the numerical value of each first azimuth angle is determined based on the angular interval.

For example, in a case where the angular range of the first azimuth angle ranges from −90 degrees to 90 degrees, and the total number of first azimuth angles is five, the angular interval between two adjacent first azimuth angles is determined to be 45 degrees. An angle of a first azimuth angle is 90 degrees, an angle of a second first azimuth angle is 45 degrees, an angle of a third first azimuth angle is 0 degrees, an angle of a fourth first azimuth angle is-45 degrees, and an angle of a fifth first azimuth angle is-90 degrees.

It should be noted that the angular range of the first azimuth angle in the embodiment of the present disclosure is included in the beam information. Or, the angular range of the first azimuth angle is specified by a protocol, which is not limited to the embodiment of the present disclosure.

In addition, after the total number of first azimuth angles and the angular range of the first azimuth angle are provided according to the embodiment of the present disclosure, the numerical value of each first azimuth angle may be determined. Since there is an implicit correspondence relationship between the first azimuth angle and the receiving beam, the identifier of the receiving beam corresponding to each first azimuth angle may be determined by the network device, and the signal quality of the other reference signals may be subsequently predicted by the network device according to the determined identifier of the receiving beam and the signal quality prediction model.

(8) The total number of second azimuth angles.

In the embodiment of the present disclosure, the total number of second azimuth angles reported by the terminal is the number of second azimuth angles having different numerical values used by the terminal. The second azimuth angle is a second azimuth angle corresponding to the receiving beam of the terminal. The number of second azimuth angles used by the terminal may be reported by the terminal, and then the number of second azimuth angles used by the terminal may be determined by the network device. In addition, the numerical value of each second azimuth angle may be further determined by the network device based on the total number of second azimuth angles.

In some embodiments, after the total number of second azimuth angles is determined, the numerical value of each second azimuth angle may be determined according to an angular range of the second azimuth angles and the total number of second azimuth angles.

Optionally, the total number of second azimuth angles is obtained, and then the angular range of the second azimuth angles is obtained, to determine an angular interval between two adjacent second azimuth angles. Then, the numerical value of each second azimuth angle is determined based on the angular interval.

For example, in a case where the angular range of the second azimuth angle ranges from 0 degrees to 90 degrees and the total number of second azimuth angles is four, the angular interval between two adjacent second azimuth angles is determined to be 30 degrees. An angle of a first second azimuth angle is 0 degrees, an angle of a second azimuth angle is 30 degrees, an angle of a third second azimuth angle is 60 degrees, and an angle of a fourth second azimuth angle is 90 degrees.

It should be noted that the angular range of the second azimuth angle in the embodiment of the present disclosure is included in the beam information, or the angular range of the second azimuth angle is specified by a protocol, which is not limited to the embodiment of the present disclosure.

In addition, after the total number of second azimuth angles and the angular range of the second azimuth angle are provided according to the embodiment of the present disclosure, the numerical value of each second azimuth angle may be determined. Since there is an implicit correspondence relationship between the second azimuth angle and the receiving beam, the identifier of the receiving beam corresponding to each second azimuth angle may be determined by the network device, and the signal quality of the other reference signals may be subsequently predicted by the network device according to the determined identifier of the receiving beam and the signal quality prediction model.

(9) An identifier of an antenna panel.

In the embodiment of the present disclosure, the antenna panel is an antenna panel configured by the terminal. In addition, the receiving beam of the terminal corresponds to the antenna panel. Each antenna panel also has a corresponding identifier, and the antenna panel can be indicated by the identifier of the antenna panel.

In some embodiments, the identifier of the antenna panel is determined by using a maximum number of ports supporting the sounding reference signal (SRS). Alternatively, the identifier of the antenna panel is determined by using an identifier of an SRS resource.

In some embodiments, the maximum number of ports of the SRS is indicated by a capability value. The identifier of the capability value is a capability value set ID or a capability value ID. The identifier of the SRS resource is an SRS resource ID or an SRS resource set ID.

(10) The total number of antenna panels.

In the embodiment of the present disclosure, the terminal includes at least one antenna panel. The total number of antenna panels is reported to the network device by the terminal, so that the number of antenna panels that are included in the terminal may be determined by the network device.

It should be noted that in the embodiment of the present disclosure, different antenna panels correspond to different beams, such that the identifier of the receiving beam may be determined based on the identifier of the antenna panel, and the signal quality of the other reference signals may be subsequently predicted by the network device according to the determined identifier of the receiving beam and the signal quality prediction model. In addition, an antenna gain may be affected by different antenna panels. After the antenna gain is determined based on the number of antenna panels, the signal quality of the other reference signals may be subsequently predicted by the terminal according to the determined antenna gain and the signal quality prediction model.

In the solution according to the embodiment of the present disclosure, the beam information of the receiving beam reported by the terminal includes various parameters, enriching the amount of information reported by the terminal, which can further be provided to the network device for determining the signal quality of the reference signal, thereby improving the accuracy of the determined signal quality.

Figure 5:
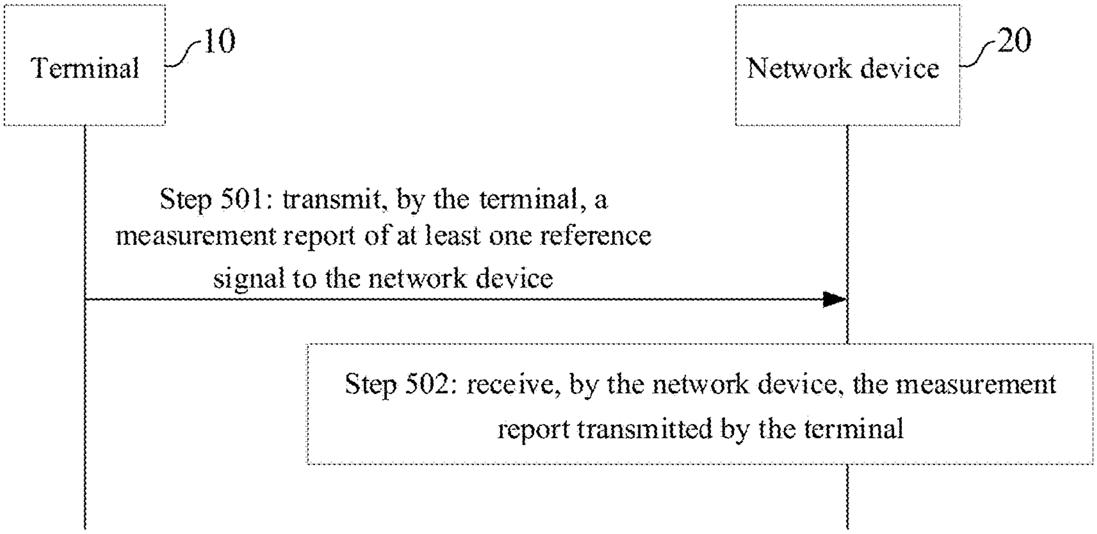
FIG. 5 is a flowchart of a method for transmitting information according to an example of the present disclosure.

Based on the embodiment shown in FIG. 2, the terminal 10 is required to report the signal quality of the reference signal to the network device 20. The terminal 10 reports to the network device 20 with a measurement report. With reference to FIG. 5, the method includes steps 501 to 502 as follows.

Step 501: a measurement report of at least one reference signal is reported to the network device by the terminal.

In the embodiment of the present disclosure, the network device configures the reference signal resource for the terminal, and the reference signal resource is configured to transmit the reference signal to the terminal by the network device. For the terminal, it receives the reference signal transmitted by the network device on the reference signal resource configured by the network device via the at least one receiving beam of the terminal, measures the signal quality of the received reference signal, generates a measurement report including the signal quality of the reference signal, and transmits the generated measurement report to the network device.

The measurement report includes at least one of the following: (1)-(4).

(1) An identifier of the reference signal.

In the embodiment of the present disclosure, the measurement report reported by the terminal includes the identifier of the reference signal, and the reference signal measured by the terminal is indicated by the identifier of the reference signal.

(2) An L1-RSRP corresponding to the reference signal.

In the embodiment of the present disclosure, the reference signal may be measured by the terminal to obtain the L1-RSRP corresponding to the reference signal, and then the L1-RSRP corresponding to the measured reference signal is carried in the measurement report.

(3) An L1-SINR corresponding to the reference signal.

In the embodiment of the present disclosure, the reference signal may be measured by the terminal to obtain the L1-SINR corresponding to the reference signal, and then the L1-SINR corresponding to the measured reference signal is carried in the measurement report.

(4) Beam information of a receiving beam corresponding to the L1-RSRP or the L1-SINR that corresponds to the reference signal.

In the embodiment of the present disclosure, the measured quality of the reference signal is carried in the measurement report reported by the terminal. In addition, the beam information of the receiving beam corresponding to the quality of the reference signal may be further carried in the measurement report. The beam information of the receiving beam is a part of the information included in the beam information in the embodiments described above.

In some embodiments, the beam information of the receiving beam corresponding to the reference signal includes at least one of the following: (1)-(6).

(1) An identifier of the receiving beam.

(2) A value of a first azimuth angle.

The first azimuth angle in the embodiment of the present disclosure refers to the first azimuth angle of the receiving beam corresponding to the L1-RSRP or the L1-SINR that corresponds to the reference signal. In fact, the measurement report reported by the terminal includes the first azimuth angle that has a correspondence relationship with the receiving beam corresponding to the L1-RSRP or the L1-SINR that corresponds to the reference signal.

(3) An identifier of the first azimuth angle.

(4) A value of a second azimuth angle.

The second azimuth angle in the embodiment of the present disclosure refers to the second azimuth angle of the receiving beam corresponding to the L1-RSRP or the L1-SINR that corresponds to the reference signal. In fact, the measurement report reported by the terminal includes the second azimuth angle that has a correspondence relationship with the receiving beam corresponding to the L1-RSRP or the L1-SINR that corresponds to the reference signal.

(5) An identifier of the second azimuth angle.

(6) An identifier of an antenna panel.

The first azimuth angle, the second azimuth angle, and the antenna panel are all parameters corresponding to the receiving beam.

It should be noted that the measurement report at least includes pieces of beam information of receiving beam(s) corresponding to N reference signals, and the pieces of beam information of the receiving beam(s) corresponding to the N reference signals are the same or different. In other words, the beam information of the receiving beam(s) corresponding to the N reference signals includes at least one of the six items described above. In a case where the pieces of beam information of the receiving beams corresponding to the N reference signals are different, at least one item of the plurality of items included in the beam information of the receiving beams corresponding to the N reference signals is different, where N is a positive integer greater than 1.

It should be noted that the execution order of the step 501 and the step 201 in the embodiment of the present disclosure is not limited. For example, the step 501 is executed before the step 201. Alternatively, the step 501 and the step 201 are executed simultaneously. Alternatively, the step 501 is executed after the step 201. Alternatively, the step 501 is adopted instead of the step 201, and the beam information may be reported through the measurement report in the step 501.

Step 502: the measurement report transmitted by the terminal is received by the network device.

In the embodiment of the present disclosure, the measurement report transmitted by the terminal is received by the network device. The signal quality of the reference signal that is measured by the terminal may be determined through the measurement report. In addition, the beam information of the at least one receiving beam reported by the terminal is further received by the network device. In other words, the beam information of the at least one receiving beam and the signal quality of the reference signals that are received through these receiving beams are reported by the terminal, and the signal quality of the other reference signals may be determined by the network device based on the received measurement report.

The measurement report transmitted by the terminal includes the beam information of the at least one receiving beam and further includes the signal quality of the reference signal that is measured through the at least one receiving beam. In this case, the network device can determine the at least one receiving beam reported by the terminal according to the beam information of the at least one receiving beam and use the signal quality of the reference signal received through the at least one receiving beam. The network device can determine the signal quality of the other reference signals other than the at least one reference signal according to the determined at least one receiving beam and the signal quality of the reference signal received through the at least one receiving beam.

In the solution according to the embodiment of the present disclosure, the beam information of the receiving beam is carried by the terminal in the measurement report, so that the beam information of the at least one receiving beam and the signal quality of the reference signal received through the at least one receiving beam are reported to the network device through the measurement report. This can save the transmission resource and improve transmission efficiency.

Figure 6:
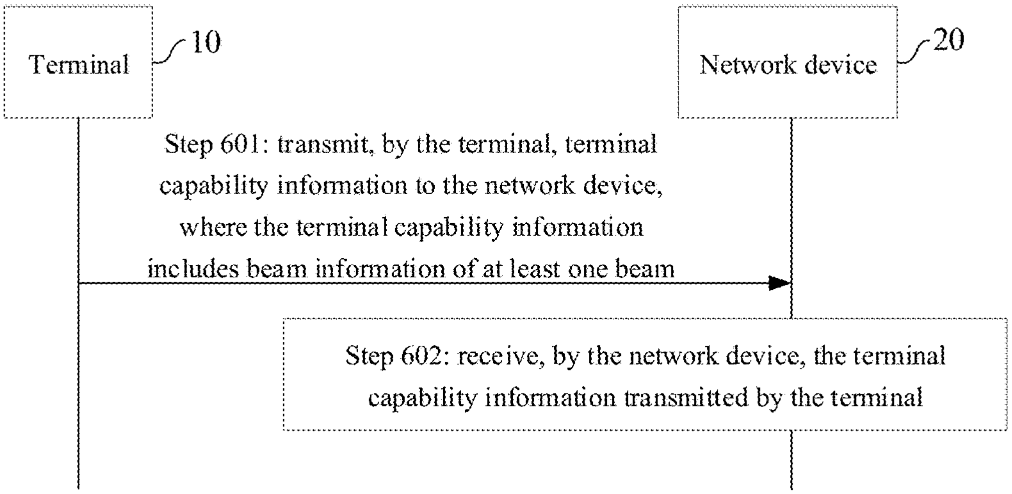
FIG. 6 is a flowchart of a method for transmitting information according to an example of the present disclosure.

Based on the example shown in FIG. 2, the beam information is reported to the network device 20 by the terminal 10 through terminal capability information. FIG. 6 illustrates a flowchart of a method for transmitting information according to an example of the present disclosure. With reference to FIG. 6, the method includes steps 601 to 602 as follows.

Step 601: the terminal capability information is transmitted to the network device by the terminal, where the terminal capability information includes beam information of at least one receiving beam.

In the embodiment of the present disclosure, the capability information of the terminal is reported to the network device by the terminal. When reporting through the terminal capability information, the beam information of the at least one receiving beam may be further carried by the terminal, so that the beam information of the receiving beam is transmitted to the network device.

In some optional embodiments, the beam information includes at least one of the following: (1) the total number of receiving beams, (2) the total number of first azimuth angles, (3) the total number of second azimuth angles, (4) the total number of antenna panels, or (5) the value of the first azimuth angle.

In the embodiment of the present disclosure, the value of the first azimuth angle is reported by the terminal through the beam information, and the first azimuth angle has no correspondence relationship with the reference signal.

(6) The value of the second azimuth angle.

In the embodiment of the present disclosure, the value of the second azimuth angle is reported by the terminal through the beam information, and the second azimuth angle has no correspondence relationship with the reference signal.

In other words, the terminal capability information transmitted by the terminal to the network device includes at least one of the plurality of items described above.

It should be noted that the execution order of the step 601 and the step 201 in the embodiment of the present disclosure is not limited. For example, the step 601 is executed before the step 201. Alternatively, the step 601 and the step 201 are executed simultaneously. Alternatively, the step 601 is executed after the step 201. Alternatively, the step 601 replaces the step 201, and the beam information may be reported through the terminal capability information in the step 601. In addition, the execution order of the step 501 and the step 601 in the embodiment of the present disclosure is not limited. For example, the step 501 is executed before the step 601. Alternatively, the step 501 and the step 601 are executed simultaneously. Alternatively, the step 501 is executed after the step 601.

Step 602: the terminal capability information transmitted by the terminal is received by the network device.

After receiving the terminal capability information transmitted by the terminal, the network device may determine the capability information of the terminal as well as the beam information of the receiving beam of the terminal. The signal quality of the other reference signals is subsequently determined based on the beam information of the receiving beam.

In the solution according to the embodiment of the present disclosure, the terminal carries the beam information of the receiving beam in the terminal capability information, to report the beam information through the terminal capability information. In this way, the transmission resource is saved, and the transmission efficiency is improved.

It should be noted that the embodiments described above can be split into new embodiments or combined with other embodiments into new examples, and the combination of the embodiments is not limited to the present disclosure.

Figure 7:
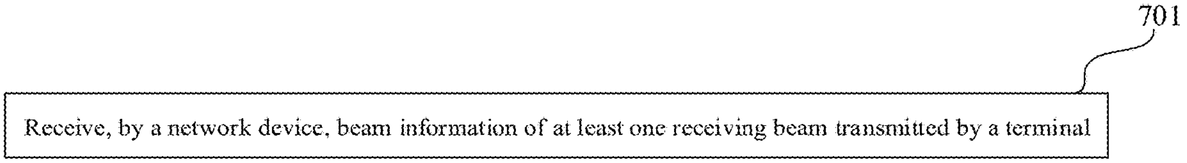
FIG. 7 is a flowchart of a method for transmitting information according to an example of the present disclosure.

FIG. 7 illustrates a flowchart of a method for transmitting information according to an example of the present disclosure. With reference to FIG. 7, the method includes step 701.

Step 701: beam information of at least one receiving beam transmitted by a terminal is received by a network device.

The terminal measures one or more reference signals based on reference signal resource(s) configured by the network device, to determine the reference signal quality of each reference signal transmitted by the network device. When measuring these reference signals, for each reference signal, the terminal may use at least one receiving beam of a plurality of receiving beams of the terminal to measure the reference signal quality of the reference signal. After the measurement, the terminal may further report the beam information of the receiving beam/these receiving beams to facilitate the beam information of the receiving beam/the receiving beams reported by the terminal is received by the network device. The reference signal quality corresponding to other reference signals may be subsequently determined by the network device based on the reference signal quality/qualities reported by the terminal and corresponding beam information.

In some embodiments, the reference signal resource configured for the terminal by the network device is a CSI-RS, and the reference signal resource is an SSB. Accordingly, the reference signal transmitted to the terminal by the network device is the CSI-RS in a case where the reference signal resource configured for the terminal by the network device is the CSI-RS; the reference signal transmitted to the terminal by the network device is the SSB in a case where the reference signal resource configured for the terminal by the network device is the SSB, which are not limited to the example of the present disclosure.

In some embodiments, the beam information includes at least one of the following: (1)-(10).

(1) An identifier of the receiving beam.

Each receiving beam may be indicated by the identifier. For example, the identifier of the receiving beam is an ID of the receiving beam.

With reference to FIG. 4, the terminal includes four receiving beams, i.e., the receiving beam 5, the receiving beam 6, the receiving beam 7, and the receiving beam 8. In this case, the terminal may report the receiving beam 5, the receiving beam 6, the receiving beam 7 and the receiving beam 8 may be reported by, to indicate these four receiving beams.

(2) A value of a first azimuth angle.

In the embodiment of the present disclosure, the beam information includes the first azimuth angle. The first azimuth angle indicates an azimuth angle corresponding to the receiving beam. In other words, the first azimuth angle of the receiving beams has a numerical value, and the beam information includes the first azimuth angle corresponding to each receiving beam.

(3) An identifier of the first azimuth angle.

In the embodiment of the present disclosure, the first azimuth angle has a numerical value, and the numerical value of the first azimuth angle may be indicated by the identifier of the first azimuth angle. In other words, the identifier of the first azimuth angle has a correspondence relationship with the numerical value of the first azimuth angle, and the first azimuth angle may be determined according to the identifier of the first azimuth angle and the correspondence relationship.

It should be noted that there is an implicit correspondence relationship between the first azimuth angle and the receiving beam in the embodiment of the present disclosure. In other words, after the value of the first azimuth angle or the identifier of the first azimuth angle are reported by terminal, an identifier of a corresponding receiving beam may be determined by the network device according to the value of the first azimuth angle or the identifier of the first azimuth angle, and the signal quality of the other reference signals may be subsequently predicted by the network device according to the determined identifier of the receiving beam and the signal quality prediction model.

(4) A value of a second azimuth angle.

In the embodiment of the present disclosure, the beam information includes the second azimuth angle. The second azimuth angle indicates an azimuth angle corresponding to the receiving beam. In other words, the second azimuth angle of the receiving beam has a numerical value, and the beam information includes the second azimuth angle corresponding to each receiving beam.

(5) An identifier of the second azimuth angle.

The second azimuth angle corresponding to the receiving beam is similar to the first azimuth angle corresponding to the receiving beam, which will not be repeated here.

It should be noted that the first azimuth angle in the embodiment of the present disclosure is an angle in a horizontal dimension, and the second azimuth angle is an angle in a vertical dimension. Alternatively, the first azimuth angle is an angle in the vertical dimension, and the second azimuth angle is an angle in the horizontal dimension.

It should be noted that there is an implicit correspondence relationship between the second azimuth angle and the receiving beam in the embodiment of the present disclosure. In other words, after the value of the second azimuth angle or the identifier of the second azimuth angle are reported by terminal, an identifier of a corresponding receiving beam may be determined by the network device according to the value of the second azimuth angle or the identifier of the second azimuth angle, and the signal quality of the other reference signals may be subsequently predicted by the network device according to the determined identifier of the receiving beam and the signal quality prediction model.

(6) The total number of receiving beams.

In the embodiment of the present disclosure, the terminal includes the at least one receiving beam, and the total number of receiving beams is reported to the network device through the beam information, such that the network device may be informed of the number of receiving beams that are included by the terminal.

With reference to FIG. 4, the terminal includes four receiving beams, i.e., the receiving beam 5, the receiving beam 6, the receiving beam 7, and the receiving beam 8. In other words, the total number of receiving beams that are reported by the terminal is four.

(7) The total number of first azimuth angles.

In the embodiment of the present disclosure, the total number of first azimuth angles reported by the terminal is the number of first azimuth angles having different numerical values used by the terminal. The first azimuth angle is a first azimuth angle corresponding to the receiving beam of the terminal. The number of first azimuth angles used by the terminal may be reported by the terminal, so that the network device determines the number of first azimuth angles used by the terminal. In addition, the network device may further determine the numerical value of each first azimuth angle based on the total number of first azimuth angles.

In some embodiments, after the total number of first azimuth angles is determined, the numerical value of each first azimuth angle may be determined according to an angular range of the first azimuth angles and the total number of first azimuth angles.

Optionally, the total number of first azimuth angles is obtained, and then the angular range of the first azimuth angles is obtained, to determine an angular interval between two adjacent first azimuth angles, and then the numerical value of each first azimuth angle is determined based on the angular interval.

For example, in a case where the angular range of the first azimuth angle ranges from −90 degrees to 90 degrees, and the total number of first azimuth angles is five, the angular interval between two adjacent first azimuth angles is determined to be 45 degrees. An angle of a first azimuth angle is 90 degrees, an angle of a second first azimuth angle is 45 degrees, an angle of a third first azimuth angle is 0 degrees, an angle of a fourth first azimuth angle is-45 degrees, and an angle of a fifth first azimuth angle is-90 degrees.

It should be noted that the angular range of the first azimuth angle in the embodiment of the present disclosure is included in the beam information. Or, the angular range of the first azimuth angle is specified by a protocol, which is not limited to the embodiment of the present disclosure.

In addition, after the total number of first azimuth angles and the angular range of the first azimuth angle are provided according to the embodiment of the present disclosure, the numerical value of each first azimuth angle may be determined. Since there is an implicit correspondence relationship between the first azimuth angle and the receiving beam, the identifier of the receiving beam corresponding to each first azimuth angle may be determined by the network device, and the signal quality of the other reference signals may be subsequently predicted by the network device according to the determined identifier of the receiving beam and the signal quality prediction model.

(8) The total number of second azimuth angles.

In the embodiment of the present disclosure, the total number of second azimuth angles reported by the terminal is the number of second azimuth angles having different numerical values used by the terminal. The second azimuth angle is a second azimuth angle corresponding to the receiving beam of the terminal. The number of second azimuth angles used by the terminal may be reported by the terminal, and then the number of second azimuth angles used by the terminal may be determined by the network device. In addition, the numerical value of each second azimuth angle may be further determined by the network device based on the total number of second azimuth angles.

In some embodiments, after the total number of second azimuth angles is determined, the numerical value of each second azimuth angle may be determined according to an angular range of the second azimuth angles and the total number of second azimuth angles.

Optionally, the total number of second azimuth angles is obtained, and then the angular range of the second azimuth angles is obtained, to determine an angular interval between two adjacent second azimuth angles. Then, the numerical value of each second azimuth angle is determined based on the angular interval.

For example, in a case where the angular range of the second azimuth angle ranges from 0 degrees to 90 degrees and the total number of second azimuth angles is four, the angular interval between two adjacent second azimuth angles is determined to be 30 degrees. An angle of a first second azimuth angle is 0 degrees, an angle of a second azimuth angle is 30 degrees, an angle of a third second azimuth angle is 60 degrees, and an angle of a fourth second azimuth angle is 90 degrees.

It should be noted that the angular range of the second azimuth angle in the embodiment of the present disclosure is included in the beam information, or the angular range of the second azimuth angle is specified by a protocol, which is not limited to the embodiment of the present disclosure.

In addition, after the total number of second azimuth angles and the angular range of the second azimuth angle are provided according to the embodiment of the present disclosure, the numerical value of each second azimuth angle may be determined. Since there is an implicit correspondence relationship between the second azimuth angle and the receiving beam, the identifier of the receiving beam corresponding to each second azimuth angle may be determined by the network device, and the signal quality of the other reference signals may be subsequently predicted by the network device according to the determined identifier of the receiving beam and the signal quality prediction model.

(9) An identifier of an antenna panel.

In the embodiment of the present disclosure, the antenna panel is an antenna panel configured by the terminal. In addition, the receiving beam of the terminal corresponds to the antenna panel. Each antenna panel also has a corresponding identifier, and the antenna panel can be indicated by the identifier of the antenna panel.

In some embodiments, the identifier of the antenna panel is determined by using a maximum number of ports supporting the SRS. Alternatively, the identifier of the antenna panel is determined by using an identifier of an SRS resource.

In some embodiments, the maximum number of ports supporting the SRS is indicated by a capability value. The identifier of the capability value is a capability value set ID or a capability value ID. The identifier of the SRS resource is an SRS resource ID or an SRS resource set ID.

(10) The total number of antenna panels.

In the embodiment of the present disclosure, the terminal includes at least one antenna panel. The total number of antenna panels is reported to the network device by the terminal, so that the number of antenna panels configured in the terminal may be determined by the network device.

It should be noted that in the embodiment of the present disclosure, different antenna panels correspond to different beams, such that the identifier of the receiving beam may be determined based on the identifier of the antenna panel, and the signal quality of the other reference signals may be subsequently predicted by the network device according to the determined identifier of the receiving beam and the signal quality prediction model. In addition, an antenna gain may be affected by different antenna panels. After the antenna gain is determined based on the number of antenna panels, the signal quality of the other reference signals may be subsequently predicted by the terminal according to the determined antenna gain and the signal quality prediction model.

In some embodiments, the network device may further receive the measurement report of the at least one reference signal transmitted by the terminal.

In the embodiment of the present disclosure, the network device configures the reference signal resource and transmits the reference signal. For the terminal, it measures the reference signal transmitted by the network device through the at least one receiving beam of the terminal and the configured reference signal resource, determines the measured signal quality of the reference signal, generates the measurement report including the signal quality of the reference signal, and transmits the generated measurement report to the network device.

The measurement report includes at least one of the following: (1)-(4).

(1) An identifier of the reference signal.

In the embodiment of the present disclosure, the measurement report reported by the terminal includes the identifier of the reference signal, and the reference signal measured by the terminal is indicated by the identifier of the reference signal.

(2) An L1-RSRP corresponding to the reference signal.

In the embodiment of the present disclosure, the reference signal may be measured by the terminal to obtain the L1-RSRP corresponding to the reference signal, and then the L1-RSRP corresponding to the measured reference signal is carried in the measurement report.

(3) An L1-SINR corresponding to the reference signal.

In the embodiment of the present disclosure, the reference signal may be measured by the terminal to obtain the L1-SINR corresponding to the reference signal, and then the L1-SINR corresponding to the measured reference signal is carried in the measurement report.

(4) Beam information of a receiving beam corresponding to the L1-RSRP or the L1-SINR that corresponds to the reference signal.

In the embodiment of the present disclosure, the measured quality of the reference signal is carried by the terminal in the reported measurement report, and the beam information of the receiving beam corresponding to the reference signal may be further carried in the measurement report. The beam information of the receiving beam is a part of the information included in the beam information in the embodiments described above.

In some embodiments, the beam information of the receiving beam corresponding to the reference signal includes at least one of the following: (1)-(6).

(1) An identifier of the receiving beam.

(2) A value of the first azimuth angle.

The first azimuth angle in the embodiment of the present disclosure refers to the first azimuth angle of the receiving beam corresponding to the L1-RSRP or the L1-SINR that corresponds to the reference signal. In fact, the measurement report reported by the terminal includes the first azimuth angle that has a correspondence relationship with the receiving beam corresponding to the L1-RSRP or the L1-SINR that corresponds to the reference signal.

(3) An identifier of the first azimuth angle.

(4) A value of the second azimuth angle.

The second azimuth angle in the embodiment of the present disclosure refers to the second azimuth angle of the receiving beam corresponding to the L1-RSRP or the L1-SINR that corresponds to the reference signal. In fact, the measurement report reported by the terminal includes the second azimuth angle that has a correspondence relationship with the receiving beam corresponding to the L1-RSRP or the L1-SINR that corresponds to the reference signal.

(5) An identifier of the second azimuth angle.

(6) An identifier of an antenna panel.

In some embodiments, the measurement report at least includes pieces of beam information of receiving beam(s) corresponding to N reference signals, and the pieces of beam information of the receiving beam(s) corresponding to the N reference signals are the same or different. In other words, the beam information of the receiving beam(s) corresponding to the N reference signals includes at least one of the six items described above. In a case where the pieces of beam information of the receiving beams corresponding to the N reference signals are different, at least one item of the plurality of items included in the beam information of the receiving beams corresponding to the N reference signals is different. In a case where the pieces of beam information of the receiving beams corresponding to the N reference signals are the same, all items are the same, where N is a positive integer greater than 1.

In some embodiments, the terminal capability information reported by the terminal is received by the network device.

The terminal capability information includes the beam information of the at least one receiving beam. In the embodiment of the present disclosure, the capability information of the terminal is reported to the network device by the terminal. When reporting through the terminal capability information, the terminal may further carry the beam information of the at least one receiving beam and transmit it to the network device. After receiving the terminal capability information, the network device may determine the capability of the terminal and further determine the beam information of the receiving beam of the terminal.

In some optional embodiments, the beam information includes at least one of the following: the total number of receiving beams, the total number of first azimuth angles, the total number of second azimuth angles, the total number of antenna panels, the value of the first azimuth angle, or the value of the second azimuth angle.

In some embodiments, the signal quality of other reference signals other than at least one reference signal is determined by the network device based on the signal quality of the at least one reference signal and the beam information of the at least one receiving beam reported by the terminal, where the signal quality includes an L1-RSRP or an L1-SINR.

In the embodiment of the present disclosure, the at least one receiving beam reported by the terminal may be determined by the network device according to the beam information of the at least one receiving beam. In a case where the signal quality of the reference signal received by using the at least one receiving beam and the beam information of the at least one receiving beam are reported by the terminal, the signal quality of the other reference signals other than the at least one reference signal may be determined by the network device according to the determined at least one receiving beam and the signal quality of the reference signal received through the at least one receiving beam.

The receiving beam refers to a beam used by the terminal, i.e., the beam configured to measure the signal quality of the reference signal transmitted by the network device. The reference signal may also be transmitted by the network device through a transmitting beam of the network device, and the reference signal that is transmitted by the network device is received by the terminal through the receiving beam.

Optionally, the signal quality of the reference signal that is received by using the at least one receiving beam needs to be reported by the terminal. Before reporting, the terminal may randomly select some receiving beams to measure the signal quality of the reference signal, and the measured signal quality of the reference signal is reported to the network device.

Optionally, the terminal may randomly select some receiving beams to measure the signal quality of the reference signal and select a preset number of signal quality in high-quality of the reference signals, and the signal quality of the reference signals selected are reported to the network device. It then selects a preset number of higher signal quality of the reference signal and reports the selected signal quality of the reference signal to the network device.

In some embodiments, different reference signals are transmitted by the network device, and each reference signal transmitted by the network device is received by the terminal by using the at least one receiving beam of the terminal.

For example, as shown in FIG. 4, a reference signal 1, a reference signal 2, a reference signal 3, and a reference signal 4 are transmitted by the network device 42, and the terminal 41 includes a receiving beam 5, a receiving beam 6, a receiving beam 7, and a receiving beam 8. The reference signals transmitted by the network device 42 are received by the terminal 41 through the receiving beam 5, the receiving beam 6, the receiving beam 7, and the receiving beam 8, respectively. In other words, the reference signal 1, the reference signal 2, the reference signal 3, and the reference signal 4 transmitted by the network device 42 may be received by the terminal through the receiving beam 5; the reference signal 1, the reference signal 2, the reference signal 3, and the reference signal 4 transmitted by the network device 42 may be received by the terminal through the receiving beam 6, and so on. Each receiving beam of the terminal may receive the reference signal 1, the reference signal 2, the reference signal 3, and the reference signal 4 transmitted by the network device 42 and measure the signal quality of each reference signal received by each receiving beam. In the description, all combinations of the reference signals and the receiving beams are measured by the terminal 41. In different examples, a part of all combinations of the reference signals and the receiving beams may be measured by the terminal 41. After measuring the signal quality of the reference signal, the terminal 41 may further report the identifier of the reference signal and signal quality corresponding to the identifier of the reference signal, and obtain the beam information of the receiving beam of the signal quality corresponding to the identifier of the reference signal. The combinations of the reference signals and the receiving beams reported by the terminal 41 may include signal quality corresponding to all combinations and each combination, or signal quality corresponding to some of all combinations and each combination.

For example, as shown in FIG. 4, the reference signal 1, the reference signal 2, the reference signal 3, and the reference signal 4 are transmitted by the network device 42, and the terminal 41 includes the receiving beam 5, the receiving beam 6, the receiving beam 7, and the receiving beam 8. At least one reference signal of the four reference signals transmitted by the network device 42 may be received by the terminal 41 through each receiving beam of the four receiving beams. For example, the terminal 41 may receive the reference signal 1 transmitted by the network device 42 through the receiving beam 5, the reference signal 2 transmitted by the network device 42 through the receiving beam 6, the reference signal 3 transmitted by the network device 42 through the receiving beam 7, and the reference signal 4 transmitted by the network device 42 through the receiving beam 8. That is, each receiving beam is configured to receive and measure at least one reference signal. In addition, an identifier of at least one reference signal measured by each receiving beam and signal quality corresponding to the identifier of the reference signal are reported, and information of the receiving beam of the signal quality corresponding to the identifier of the reference signal is obtained. For example, the reference signal 1, the receiving beam 5, and the signal quality of the corresponding reference signal 1 are reported. The reference signal 2 and the receiving beam 6, and the signal quality of the corresponding reference signal 2 are reported. The reference signal 3 and the receiving beam 7, and the signal quality of the corresponding reference signal 3 are reported. The reference signal 4 and the receiving beam 8, and the signal quality of the corresponding reference signal 4 are reported.

The signal quality of the reference signal received by the terminal through the at least one receiving beam refers to the measurement for the L1-RSRP of the reference signal or the L1-SINR of the reference signal.

In some embodiments, after receiving the identifier of the reference signal, the information of the receiving beam, and the signal quality of the identifier of the reference signal reported by the terminal device, the network device sorts the signal quality of the at least one reference signal according to the identifier of the receiving beam of the terminal and/or the identifier of the reference signal, and determines the signal quality of other reference signals based on the sorted signal quality of the reference signals and a signal quality prediction model.

Since the identifier of the at least one reference signal, the signal quality of the reference signal, and information of the corresponding receiving beam are obtained by the network device, the network device can determine the receiving beam through which the terminal receives the at least one reference signal and the signal quality of each reference signal. In this way, while determining the signal quality of other reference signals, the network device can sort the reported signal quality of the reference signal(s) based on the beam information of the receiving beam(s) reported by the terminal, to obtain the signal quality of the other reference signals.

It should be noted that the signal quality prediction model in the embodiment of the present disclosure is pre-stored in the network device. Alternatively, the signal quality prediction model in the embodiment of the present disclosure is stored in a server and is transmitted to the network device by the server. Then, the signal quality of the reference signal is predicted by the network device based on the signal quality prediction model.

For the process of determining the signal quality of the other reference signals by the network device via the signal quality prediction model, the network device may sort the reported signal quality of the reference signals according to the identifier of the receiving beam of the terminal and/or the identifier of the reference signal. For the reported signal quality of the reference signal, each reported signal quality of the reference signal corresponds to the identifier of the receiving beam of the terminal and the identifier of the reference signal, and the signal quality of other reference signals may be predicted by the signal quality prediction model. The predicted signal quality of the other reference signals may include signal quality corresponding to all combinations of receiving beams and reference signals of the corresponding terminal, or signal quality corresponding to some combinations of receiving beams and reference signals of the corresponding terminal. For example, the obtained strongest signal quality of each reference signal may be predicted when all receiving beams are used to receive each of the reference signals.

In the embodiment of the present disclosure, each receiving beam of the terminal corresponds to an identifier. When the signal quality of the other reference signals is determined based on the at least one receiving beam and the signal quality of the reference signal received through the receiving beam, the network device sorts the reported signal quality of the reference signals according to the identifier(s) of the receiving beam(s). Alternatively, the network device sorts the reported signal quality of the reference signals according to the identifier(s) of the reference signal(s). Alternatively, the network device sorts the reported signal quality of the reference signals according to the identifier(s) of the receiving beam(s) and the identifier(s) of the reference signal(s). Then, the sorted signal quality of the reference signals is input into the signal quality prediction model to determine the signal quality of the other reference signals other than these reference signals.

The signal quality prediction model is configured to predict the signal quality of the reference signals received by all receiving beams, according to the signal quality of the reference signals received by some receiving beams and corresponding beam information of the receiving beams.

For example, according to the identifier of the receiving beam of the terminal, the signal quality of the at least one reference signal is sorted to obtain the sorted matrix sequence. The matrix sequence is input into the signal quality prediction model to obtain the signal quality of the other reference signals other than the at least one reference signal. Alternatively, according to the identifier of the reference signal, the signal quality of the at least one reference signal is sorted to obtain the sorted matrix sequence. The matrix sequence is input into the signal quality prediction model to obtain the signal quality of the other reference signals other than the at least one reference signal. Alternatively, according to the identifier of the receiving beam of the terminal and the identifier of the reference signal, the signal quality of the at least one reference signal is sorted to obtain the sorted matrix sequence. The sorted matrix sequence is input into the signal quality prediction model to obtain the signal quality of the other reference signals other than the at least one reference signal.

It should be noted that in the embodiment of the present disclosure, when sorting the signal quality of the at least one reference signal, the signal quality of a reference signal is set as 0 in a case where the signal quality of the reference signal is not measured.

For example, when the signal quality of the reference signals is sorted according to the identifier of the receiving beam and the identifier of the reference signal, the terminal has two receiving beams and four reference signals are transmitted by a base station, the matrix sequence input into the signal quality prediction model includes eight parameters. The eight parameters constitute a matrix sequence with one column and eight rows, that is, the receiving beam 1 of the terminal and the signal quality corresponding to the reference signal 1 of the base station, the receiving beam 1 of the terminal and the signal quality corresponding to the reference signal 2 of the base station, the receiving beam 1 of the terminal and the signal quality corresponding to the reference signal 3 of the base station, the receiving beam 1 of the terminal and the signal quality corresponding to the reference signal 4 of the base station, the receiving beam 2 of the terminal and the signal quality corresponding to the reference signal 1 of the base station, the receiving beam 2 of the terminal and the signal quality corresponding to the reference signal 2 of the base station, the receiving beam 2 of the terminal and the signal quality corresponding to the reference signal 3 of the base station, and the receiving beam 2 of the terminal and the signal quality corresponding to the reference signal 4 of the base station.

For the matrix input to the signal quality prediction model, the 8 signal qualities in the matrix are set as follows: for the reference signal and receiving beam combinations for which the terminal has reported the signal quality, the corresponding parameters in the matrix are set to the signal quality of those reference signals. For the reference signal and receiving beam combinations for which the terminal has not reported the signal quality, the corresponding parameters in the matrix are set to 0. Subsequently, the signal quality prediction model processes the input matrix and obtains an output matrix, from which the signal quality of all reference signals can be determined.

For example, after the signal quality of the reference signals is sorted by the network device according to the identifier of the receiving beam and the identifier of the reference signal, the matrix obtained is as follows:

$$\begin{bmatrix} RSRP\#1 \\ RSRP\#2 \\ RSRP\#3 \\ RSRP\#4 \\ RSRP\#5 \\ RSRP\#6 \\ RSRP\#7 \\ RSRP\#8 \end{bmatrix} = \begin{bmatrix} 0 \\ RSRP\#2 \\ 0 \\ 0 \\ RSRP\#5 \\ 0 \\ RSRP\#7 \\ RSRP\#8 \end{bmatrix}$$

The obtained matrix is input into the signal quality prediction model, and based on the signal quality prediction model, the processed matrix is output as follows:

$$\begin{bmatrix} RSRP\#1 \\ RSRP\#2 \\ RSRP\#3 \\ RSRP\#4 \\ RSRP\#5 \\ RSRP\#6 \\ RSRP\#7 \\ RSRP\#8 \end{bmatrix}$$

The matrix may denote the signal quality of the reference signals.

In the solution according to the embodiment of the present disclosure, after the signal quality of the reference signals is sorted according to the identifier of the reference signal and/or the identifier of the receiving beam of the terminal, the signal quality of the other reference signals is determined according to the sorted signal quality of the reference signals and the signal quality prediction model. Since the signal quality of the other reference signals can be determined by the signal quality prediction model according to the signal quality of some of the reference signals and the beam information of the corresponding receiving beams, the accuracy of the signal quality determined is improved.

In some embodiments, the signal quality of the at least one reference signal is grouped by the network device according to the identifier of the receiving beam of the terminal or the identifier of the reference signal. Based on the signal quality of the reference signals that are grouped and the signal quality prediction model, the signal quality of other reference signals with the same beam information as the receiving beam corresponding to the at least one reference signal is determined.

In the embodiment of the present disclosure, each receiving beam corresponds to an identifier. When determining the signal quality of the other reference signals, the signal quality of reference signals received through these receiving beams is first grouped according to the identifier of the receiving beam, to obtain the signal quality of the reference signals in different groups. Then, the signal quality of the other reference signals with the same beam information as the receiving beam corresponding to the at least one reference signal is determined according to the grouped signal quality of the reference signals and the signal quality prediction model. Alternatively, when determining the signal quality of the other reference signals, the signal quality of reference signals that are received through these receiving beams is first grouped according to the identifier of the reference signal, to obtain the signal quality of the reference signals in different groups. Then, the signal quality of the other reference signals with the same identifier as the reference signal corresponding to the at least one reference signal is determined according to the grouped signal quality of the reference signals and the signal quality prediction model.

For example, a description is made with an example of grouping the signal quality according to the identifier of the receiving beam. In a case where there are eight signal quality, i.e., the receiving beam 1 of the terminal and the signal quality corresponding to the reference signal 1 of the base station, the receiving beam 1 of the terminal and the signal quality corresponding to the reference signal 2 of the base station, the receiving beam 1 of the terminal and the signal quality corresponding to the reference signal 3 of the base station, the receiving beam 1 of the terminal and the signal quality corresponding to the reference signal 4 of the base station, the receiving beam 2 of the terminal and the signal quality corresponding to the reference signal 1 of the base station, the receiving beam 2 of the terminal and the signal quality corresponding to the reference signal 2 of the base station, the receiving beam 2 of the terminal and the signal quality corresponding to the reference signal 3 of the base station, and the receiving beam 2 of the terminal and the signal quality corresponding to the reference signal 4 of the base station.

According to the solution, according to the example of the present disclosure, the signal quality belonging to the receiving beam 1 is divided into one group. In other words, the receiving beam 1 of the terminal and the signal quality corresponding to the reference signal 1 of the base station, the receiving beam 1 of the terminal and the signal quality corresponding to the reference signal 2 of the base station, the receiving beam 1 of the terminal and the signal quality corresponding to the reference signal 3 of the base station, and the receiving beam 1 of the terminal and the signal quality corresponding to the reference signal 4 of the base station are grouped into one group. The receiving beam 2 of the terminal and the signal quality corresponding to the reference signal 1 of the base station, the receiving beam 2 of the terminal and the signal quality corresponding to the reference signal 2 of the base station, the receiving beam 2 of the terminal and the signal quality corresponding to the reference signal 3 of the base station, and the receiving beam 2 of the terminal and the signal quality corresponding to the reference signal 4 of the base station are grouped into another group.

The solution for predicting the signal quality of the reference signal in the embodiment of the present disclosure is similar to the embodiments described above, which will not be repeated here.

Figure 8:
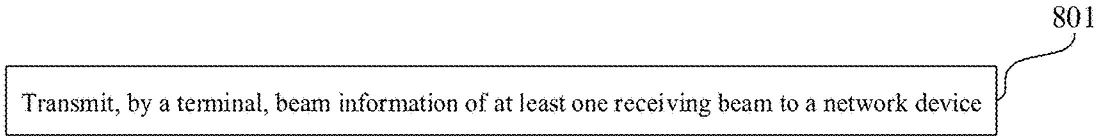
FIG. 8 is a flowchart of a method for transmitting information according to an example of the present disclosure.

FIG. 8 illustrates a flowchart of a method for transmitting information according to an embodiment of the present disclosure. With reference to FIG. 8, the method includes step 801.

Step 801: beam information of at least one receiving beam is transmitted to the network device by the terminal.

The terminal measures reference signals based on reference signal resources configured by the network device, to determine the reference signal quality of reference signals transmitted by the network device. When these reference signals are measured by the terminal, the reference signal quality of the reference signal may be measured by the terminal with receiving beams of the at least one receiving beam of the terminal for each reference signal. After the measurement, the beam information of these receiving beams may be further reported by the terminal, and then the beam information of the receiving beams reported by the terminal is received by the network device.

In some embodiments, the reference signal resource configured for the terminal by the network device is the CSI-RS resource, or the reference signal resource is the SSB resource. Accordingly, the reference signal transmitted to the terminal by the network device is the CSI-RS signal in a case where the reference signal resource configured for the terminal by the network device is the CSI-RS resource; and the reference signal transmitted to the terminal by the network device is the SSB in a case where the reference signal resource configured for the terminal by the network device is the SSB resource, which is not limited to the example of the present disclosure.

In some embodiments, the beam information includes at least one of the following: (1)-(10).

(1) An identifier of the receiving beam.

Each receiving beam may be indicated by an identifier. For example, the identifier of the receiving beam is the receiving beam ID.

With reference to FIG. 4, the terminal includes four receiving beams, i.e., the receiving beam 5, the receiving beam 6, the receiving beam 7, and the receiving beam 8. In other words, the receiving beam 5, the receiving beam 6, the receiving beam 7, and the receiving beam 8 may be reported by the terminal, thereby these four receiving beams are indicated accordingly.

(2) A value of a first azimuth angle.

In the embodiment of the present disclosure, the first azimuth angle of the receiving beams has a numerical value, and the beam information includes the first azimuth angle corresponding to each receiving beam.

(3) An identifier of the first azimuth angle.

In the embodiment of the present disclosure, the first azimuth angle has a numerical value, and the numerical value of the first azimuth angle may be indicated by the identifier of the first azimuth angle. In other words, the identifier of the first azimuth angle has a correspondence relationship with the numerical value of the first azimuth angle, where the first azimuth angle may be determined according to the identifier of the first azimuth angle and the correspondence relationship.

It should be noted that there is an implicit correspondence relationship between the first azimuth angle and the receiving beam in the embodiment of the present disclosure. In other words, after the value of the first azimuth angle or the identifier of the first azimuth angle are reported by the terminal, the network device may determine the identifier of the corresponding receiving beam according to the value of the first azimuth angle or the identifier of the first azimuth angle. Subsequently, the network device may predict the signal quality of other reference signals according to the determined identifier of the receiving beam and the signal quality prediction model.

(4) A value of a second azimuth angle.

(5) An identifier of the second azimuth angle.

The second azimuth angle is similar to the first azimuth angle, which will not be repeated here.

It should be noted that the first azimuth angle in the embodiment of the present disclosure is an angle in a horizontal dimension, and the second azimuth angle is an angle in a vertical dimension. Alternatively, the first azimuth angle is an angle in a vertical dimension, and the second azimuth angle is an angle in a horizontal dimension.

It should be noted that there is an implicit correspondence relationship between the second azimuth angle and the receiving beam in the embodiment of the present disclosure. In other words, after the value of the second azimuth angle or the identifier of the second azimuth angle is reported by the terminal, the network device may determine the identifier of the corresponding receiving beam according to the value of the second azimuth angle or the identifier of the second azimuth angle. Subsequently, the network device may predict the signal quality of the other reference signals according to the determined identifier of the receiving beam and the signal quality prediction model.

(6) A total number of receiving beams.

In the embodiment of the present disclosure, the terminal includes the at least one receiving beam, and the total number of receiving beams is reported to the network device through the beam information. In this way, the network device may be informed of the number of receiving beams that are included by the terminal.

With reference to FIG. 4, the terminal includes four receiving beams, i.e., the receiving beam 5, the receiving beam 6, the receiving beam 7, and the receiving beam 8. In other words, the total number of receiving beams reported by the terminal is four.

(7) The total number of first azimuth angles.

In the embodiment of the present disclosure, the total number of first azimuth angles reported by the terminal is the number of first azimuth angles having different numerical values that are used by the terminal. The first azimuth angle is a first azimuth angle corresponding to the receiving beam of the terminal. The number of first azimuth angles used by the terminal may be reported by the terminal, so that the network device determines the number of first azimuth angles used by the terminal. In addition, the network device may further determine the numerical value of each first azimuth angle based on the total number of first azimuth angles.

In some embodiments, after the total number of first azimuth angles is determined, the numerical value of each first azimuth angle may be determined according to an angular range of the first azimuth angles and the total number of first azimuth angles.

Optionally, the total number of first azimuth angles is obtained, and then the angular range of the first azimuth angles is obtained, to determine an angular interval between two adjacent first azimuth angles, and then the numerical value of each first azimuth angle is determined based on the angular interval.

For example, in a case where the angular range of the first azimuth angle ranges from −90 degrees to 90 degrees, and the total number of first azimuth angles is five, the angular interval between two adjacent first azimuth angles is determined to be 45 degrees. In this case, an angle of a first azimuth angle is 90 degrees, an angle of a second first azimuth angle is 45 degrees, an angle of a third first azimuth angle is 0 degrees, an angle of a fourth first azimuth angle is −45 degrees, and an angle of a fifth first azimuth angle is −90 degrees.

It should be noted that the angular range of the first azimuth angle in the embodiment of the present disclosure is included in the beam information, or the angular range of the first azimuth angle is specified by a protocol, which is not limited to the embodiment of the present disclosure.

In addition, after the total number of first azimuth angles and the angular range of the first azimuth angle are provided according to the embodiment of the present disclosure, the numerical value of each first azimuth angle may be determined. Since there is an implicit correspondence relationship between the first azimuth angle and the receiving beam, the identifier of the receiving beam corresponding to each first azimuth angle may be determined by the network device, and the signal quality of the other reference signals may be subsequently predicted by the network device according to the determined identifier of the receiving beam and the signal quality prediction model.

(8) The total number of second azimuth angles.

In the embodiment of the present disclosure, the total number of second azimuth angles reported by the terminal is the number of second azimuth angles having different numerical values used by the terminal. The second azimuth angle is a second azimuth angle corresponding to the receiving beam of the terminal. The number of second azimuth angles used by the terminal may be reported by the terminal, and then the number of second azimuth angles used by the terminal may be determined by the network device. In addition, the numerical value of each second azimuth angle may be further determined by the network device based on the total number of second azimuth angles.

In some embodiments, after the total number of second azimuth angles is determined, the numerical value of each second azimuth angle may be determined according to an angular range of the second azimuth angles and the total number of second azimuth angles.

Optionally, the total number of second azimuth angles is obtained, and then the angular range of the second azimuth angles is obtained, to determine an angular interval between two adjacent second azimuth angles. Then, the numerical value of each second azimuth angle is determined based on the angular interval.

For example, in a case where the angular range of the second azimuth angle ranges from 0 degrees to 90 degrees, and the total number of second azimuth angles is four, the angular interval between two adjacent second azimuth angles is determined to be 30 degrees. In this case, an angle of a first second azimuth angle is 0 degrees, an angle of a second azimuth angle is 30 degrees, an angle of a third second azimuth angle is 60 degrees, and an angle of a fourth second azimuth angle is 90 degrees.

It should be noted that the angular range of the second azimuth angle in the embodiment of the present disclosure is included in the beam information, or the angular range of the second azimuth angle is specified by a protocol, which is not limited to the embodiment of the present disclosure.

In addition, after the total number of second azimuth angles and the angular range of the second azimuth angle are provided according to the embodiment of the present disclosure, the numerical value of each second azimuth angle may be determined. Since there is an implicit correspondence relationship between the second azimuth angle and the receiving beam, the identifier of the receiving beam corresponding to each second azimuth angle may be determined by the network device, and the signal quality of the other reference signals may be subsequently predicted by the network device according to the determined identifier of the receiving beam and the signal quality prediction model.

(9) An identifier of an antenna panel.

In the embodiment of the present disclosure, the antenna panel is an antenna panel configured by the terminal. In addition, the receiving beam of the terminal corresponds to the antenna panel. Each antenna panel also has a corresponding identifier, and the antenna panel can be indicated by the identifier of the antenna panel.

In some embodiments, the identifier of the antenna panel is determined by using a maximum number of ports supporting the SRS. Alternatively, the identifier of the antenna panel is determined by using an identifier of an SRS resource.

The maximum number of ports supporting the SRS is indicated by a capability value. The identifier of the capability value is a capability value set ID or a capability value ID. The identifier of the SRS resource is an SRS resource ID or an SRS resource set ID.

(10) The total number of antenna panels.

In the embodiment of the present disclosure, the terminal is provided with at least one antenna panel. The total number of antenna panels is reported to the network device by the terminal, so that the number of antenna panels that are provided in the terminal may be determined by the network device.

It should be noted that in the embodiment of the present disclosure, since different antenna panels correspond to different beams, the identifier of the receiving beam may be determined based on the identifier of the antenna panel, and the signal quality of the other reference signals may be subsequently predicted by the network device according to the determined identifier of the receiving beam and the signal quality prediction model. In addition, an antenna gain may be affected by different antenna panels. After the antenna gain is determined based on the number of antenna panels, the signal quality of the other reference signals may be subsequently predicted by the terminal according to the determined antenna gain and the signal quality prediction model.

In some embodiments, the measurement report of the at least one reference signal is transmitted to the network device by the terminal.

In the embodiment of the present disclosure, the reference signal resource is configured by the network device, and then the reference signal is transmitted by the network device. For the terminal, the reference signal transmitted by the network device is measured by the terminal through the at least one receiving beam of the terminal and the configured reference signal resource. The measured signal quality of the reference signal received is determined, the measurement report including the signal quality of the reference signal is generated, and the generated measurement report is transmitted to the network device.

The measurement report includes at least one of the following: (1)-(4).

(1) An identifier of the reference signal.

In the embodiment of the present disclosure, the measurement report reported by the terminal includes the identifier of the reference signal, and the reference signal measured by the terminal is indicated by the identifier of the reference signal.

(2) An L1-RSRP corresponding to the reference signal.

In the embodiment of the present disclosure, the reference signal may be measured by the terminal to obtain the L1-RSRP corresponding to the reference signal, and then the L1-RSRP corresponding to the measured reference signal is carried in the measurement report.

(3) An L1-SINR corresponding to the reference signal.

In the embodiment of the present disclosure, the reference signal may be measured by the terminal to obtain the L1-SINR corresponding to the reference signal, and then the L1-SINR corresponding to the measured reference signal is carried in the measurement report.

(4) Beam information of a receiving beam corresponding to the L1-RSRP or the L1-SINR that corresponds to the reference signal.

In the embodiment of the present disclosure, the measured quality of the reference signal is carried in the measurement report reported by the terminal. In addition, the beam information of the receiving beam corresponding to the quality of the reference signal may be further carried in the measurement report. The beam information of the receiving beam is a part of the information included in the beam information in the embodiments described above.

In some embodiments, the beam information of the receiving beam corresponding to the reference signal includes at least one of the following: (1)-(6).

(1) An identifier of the receiving beam.

(2) A value of a first azimuth angle.

The first azimuth angle in the embodiment of the present disclosure refers to the first azimuth angle of the receiving beam corresponding to the L1-RSRP or the L1-SINR that corresponds to the reference signal. In fact, the measurement report reported by the terminal includes the first azimuth angle that has a correspondence relationship with the receiving beam corresponding to the L1-RSRP or the L1-SINR that corresponds to the reference signal.

(3) An identifier of the first azimuth angle.

(4) A value of a second azimuth angle.

The second azimuth angle in the embodiment of the present disclosure refers to the second azimuth angle of the receiving beam corresponding to the L1-RSRP or the L1-SINR that corresponds to the reference signal. In fact, the measurement report reported by the terminal includes the second azimuth angle that has a correspondence relationship with the receiving beam corresponding to the L1-RSRP or the L1-SINR that corresponds to the reference signal.

(5) An identifier of the second azimuth angle.

(6) An identifier of an antenna panel.

In some embodiments, the measurement report at least includes pieces of beam information of receiving beam(s)

corresponding to N reference signals, and the pieces of beam information of the receiving beam(s) corresponding to the N reference signals are the same or different. In other words, the beam information of the receiving beam(s) corresponding to the N reference signals includes at least one of the six items described above. In a case where the pieces of beam information of the receiving beams corresponding to the N reference signals are different, at least one item of the plurality of items included in the beam information of the receiving beams corresponding to the N reference signals is different. In a case where the pieces of beam information of the receiving beams corresponding to the N reference signals are the same, all items are the same, where N is a positive integer greater than 1.

In some embodiments, the terminal capability information is transmitted to the network device by the terminal.

The terminal capability information includes the beam information of the at least one receiving beam. In the embodiment of the present disclosure, the terminal capability information is reported to the network device by the terminal. When reporting the terminal capability information, the beam information of the at least one receiving beam may be further carried by the terminal, and the beam information of the receiving beam is transmitted to the network device. After the terminal capability information is received by the network device, the capability of the terminal may be determined, and the beam information of the receiving beam of the terminal may be further determined.

In some optional embodiments, the beam information includes at least one of the following: the total number of receiving beams, the total number of first azimuth angles, the total number of second azimuth angles, the total number of antenna panels, the value of the first azimuth angle, or the value of the second azimuth angle.

It should be noted that the steps executed in the embodiment of the present disclosure are similar to those executed in the embodiments described above, which will not be repeated here.

Description is illustratively made below by combining the embodiments described above.

The beam information of the receiving beam is reported by the terminal, and the beam information of the receiving beam includes at least one of the following: (1) an identifier of the receiving beam, (2) a value of a first azimuth angle, (3) an identifier of the first azimuth angle, (4) a value of a second azimuth angle, (5) an identifier of the second azimuth angle, (6) the total number of receiving beams, (7) the total number of first azimuth angles, (8) the total number of second azimuth angles, (9) an identifier of an antenna panel, or (10) the total number of antenna panels.

The beam information of the receiving beam in the embodiment of the present disclosure is similar to that in the embodiments described above, which will not be repeated here.

In some embodiments, the beam information of the receiving beam is included in the measurement report reported by the terminal.

The measurement report includes at least one of the following: (1) an identifier of the reference signal, (2) an L1-RSRP corresponding to the reference signal, (3) an L1-SINR corresponding to the reference signal, or (4) beam information of a receiving beam corresponding to the L1-RSRP or the L1-SINR that corresponds to the reference signal.

The beam information of the receiving beam corresponding to the reference signal includes at least one of the following: (1) an identifier of the receiving beam, (2) a value of a first azimuth angle, (3) an identifier of the first azimuth angle, (4) a value of a second azimuth angle, (5) an identifier of the second azimuth angle, or (6) an identifier of an antenna panel.

In some embodiments, the beam information of the receiving beam is included in the terminal capability information reported by the terminal.

The beam information includes at least one of the following: (1) the total number of receiving beams, (2) the total number of first azimuth angles, (3) the total number of second azimuth angles, (4) the total number of antenna panels, (5) the value of the first azimuth angle, or (6) the value of the second azimuth angle.

In addition, after the beam information of the receiving beam is reported by the terminal, the matrix of n rows and 1 column is input into the signal quality prediction model by the network device. The matrix of n rows and 1 column is processed by the signal quality prediction model to obtain the processed matrix of n rows and 1 column. The processed matrix of n rows and 1 column may indicate the signal quality of each of the reference signals. Measurement results of some reference signals are used in the input matrix of n rows and 1 column, and the remaining are all 0. In addition, the order of the signal quality of reference signals in the matrix of n rows and 1 column is sorted according to the identifiers of the reference signals and the identifiers of the receiving beams.

For example, four reference signals, i.e., the reference signal 1, the reference signal 2, the reference signal 3, and the reference signal 4, are transmitted by the network device. And, the terminal includes two receiving beams, i.e., the receiving beam 1 and the receiving beam 2. In this case, there are eight measurement results of the reference signals according to the combinations of the reference signals and the receiving beams. In other words, a matrix of 8 rows and 1 column may be generated.

The first four measurement results in the matrix are measurement results of four reference signals of the network device corresponding to the receiving beam 1 of the terminal.

The last four measurement results in the matrix are measurement results of four reference signals of the network device corresponding to the receiving beam 2 of the terminal.

For example, this matrix is indicated by a matrix as follows:

$$\begin{bmatrix} RSRP\#1 \\ RSRP\#2 \\ RSRP\#3 \\ RSRP\#4 \\ RSRP\#5 \\ RSRP\#6 \\ RSRP\#7 \\ RSRP\#8 \end{bmatrix}$$

In the matrix, RSRP #1 corresponds to the receiving beam 1 of the terminal and the reference signal 1. RSRP #2 corresponds to the receiving beam 1 of the terminal and the reference signal 2. RSRP #3 corresponds to the receiving beam 1 of the terminal and the reference signal 3. RSRP #4 corresponds to the receiving beam 1 of the terminal and the reference signal 4. RSRP #5 corresponds to the receiving beam 2 of the terminal and the reference signal 1. RSRP #6 corresponds to the receiving beam 2 of the terminal and the reference signal 2. RSRP #7 corresponds to the receiving beam 2 of the terminal and the reference signal 3. RSRP #8 corresponds to the receiving beam 2 of the terminal and the reference signal 4.

Figure 9:
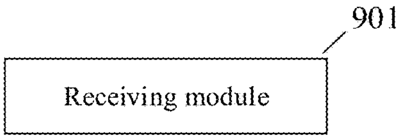
FIG. 9 is a block diagram of a device for transmitting information according to an example of the present disclosure.

FIG. 9 illustrates a block diagram of a device for transmitting information according to an example of the present disclosure. With reference to FIG. 9, the device includes a receiving module 901. The receiving module 901 is configured to receive beam information of at least one receiving beam transmitted by a terminal.

In some embodiments, the beam information includes at least one of the following: an identifier of the receiving beam, a value of a first azimuth angle, an identifier of the first azimuth angle, a value of a second azimuth angle, an identifier of the second azimuth angle, the total number of receiving beams, the total number of first azimuth angles, the total number of second azimuth angles, an identifier of an antenna panel, or the total number of antenna panels.

In some embodiments, the identifier of the antenna panel is determined by using the maximum number of ports supporting the SRS. Alternatively, the identifier of the antenna panel is determined by using an identifier of an SRS resource.

In some embodiments, the receiving module 901 is further configured to receive a measurement report of at least one reference signal transmitted by the terminal, where the measurement report includes at least one of the following: an identifier of the reference signal, an L1-RSRP corresponding to the reference signal, an L1-SINR corresponding to the reference signal, or beam information of a receiving beam corresponding to the reference signal.

In some embodiments, the beam information of the receiving beam corresponding to the reference signal includes at least one of the following: the identifier(s) of the receiving beam(s), the value(s) of the first azimuth angle(s), the identifier(s) of the first azimuth angle(s), the value(s) of the second azimuth angle(s), the identifier(s) of the second azimuth angle(s), or the identifier of the antenna panel(s).

In some embodiments, the measurement report at least includes pieces of beam information of receiving beams corresponding to N reference signals, the pieces of beam information of the receiving beams corresponding to the N reference signals are different, and N is a positive integer greater than 1.

In some embodiments, the receiving module is further configured to receive terminal capability information reported by the terminal.

The terminal capability information includes the beam information of the at least one receiving beam.

In some optional embodiments, the beam information includes at least one of the following: the total number of receiving beams, the total number of first azimuth angles, the total number of second azimuth angles, the total number of antenna panels, the value(s) of the first azimuth angle(s), or the value(s) of the second azimuth angle(s).

Figure 10:
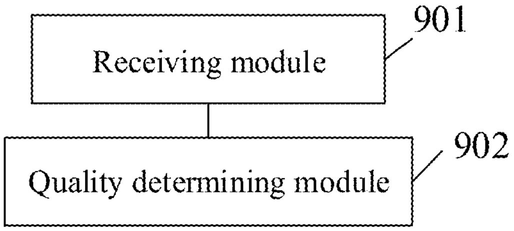
FIG. 10 is a block diagram of a device for transmitting information according to an example of the present disclosure.

In some embodiments, with reference to FIG. 10, the device includes the receiving module 901, as described in detail with reference to FIG. 9, and further includes a quality determining module 902.

The quality determining module 902 is configured to determine signal quality of other reference signals other than at least one reference signal based on signal quality of the at least one reference signal and beam information of the at least one receiving beam that are reported by the terminal, where the signal quality includes an L1-RSRP or an L1-SINR.

In some embodiments, the quality determining module 902 is further configured to sort signal quality of the at least one reference signal according to an identifier of the receiving beam and/or an identifier of the reference signal, and determine the signal quality of the other reference signals based on the sorted signal quality of the reference signal and a signal quality prediction model.

In some embodiments, the quality determining module 902 is further configured to group signal quality of the at least one reference signal according to an identifier of the receiving beam and/or an identifier of the reference signal, and determine, based on the grouped signal quality of the reference signal and the signal quality prediction model, signal quality of other reference signals with same beam information as the receiving beam corresponding to the at least one reference signal.

It should be noted that the device provided in the above embodiments is described with reference to the division of functional modules solely for illustrative purposes when implementing its functions. In practical applications, the functions mentioned above can be allocated to different functional modules as needed. In other words, the internal structure of the device may be divided into different functional modules to perform all or part of the functions described above. Additionally, the device embodiments provided above share the same concept as the method embodiments. The specific implementation process can refer to the method embodiments, which will not be repeated here.

Figure 11:
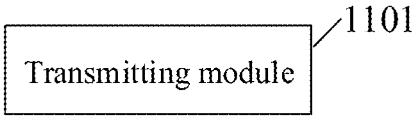
FIG. 11 is a block diagram of a device for transmitting information according to an example of the present disclosure.

FIG. 11 illustrates a block diagram of a device for transmitting information according to an embodiment of the present disclosure. With reference to FIG. 11, the device includes a transmitting module 1101.

The transmitting module 1101 is configured to transmit beam information of at least one receiving beam to a network device.

In some embodiments, the beam information includes at least one of the following: an identifier of the receiving beam, a value of a first azimuth angle, an identifier of the first azimuth angle, a value of a second azimuth angle, an identifier of the second azimuth angle, the total number of receiving beams, the total number of first azimuth angles, the total number of second azimuth angles, an identifier of an antenna panel, or the total number of antenna panels.

In some embodiments, the identifier of the antenna panel is determined by using the maximum number of ports supporting the SRS. Or the identifier of the antenna panel is determined by using an identifier of an SRS resource.

In some embodiments, the transmitting module 1101 is configured to transmit a measurement report of at least one reference signal to the network device, where the measurement report includes at least one of the following: an identifier of the reference signal, an L1-RSRP corresponding to the reference signal, an L1-SINR corresponding to the reference signal, or beam information of a receiving beam corresponding to the reference signal.

In some embodiments, the measurement result includes at least one of the following: an identifier of the reference signal L1-RSRP corresponding to the reference signal, an L1-SINR corresponding to the reference signal, or beam information of a receiving beam corresponding to the reference signal.

In some embodiments, the beam information of the receiving beam corresponding to the reference signal includes at least one of the following: an identifier of the receiving beam, a value of a first azimuth angle an identifier of the first azimuth angle a value of a second azimuth angle an identifier of the second azimuth angle, or an identifier of an antenna panel.

In some embodiments, the measurement report at least includes pieces of beam information of receiving beam(s) corresponding to N reference signals, the pieces of beam information of the receiving beam(s) corresponding to the N reference signals are different, where N is a positive integer greater than 1.

In some embodiments, the transmitting module 1101 is further configured to transmit terminal capability information to the network device.

The terminal capability information includes the beam information of the at least one receiving beam.

In some optional embodiments, the beam information includes at least one of the following: the total number of receiving beams, the total number of first azimuth angles, the total number of second azimuth angles, the total number of antenna panels, the value(s) of the first azimuth angle(s), or the value(s) of the second azimuth angle(s).

It should be noted that the device provided in the above embodiments is described with reference to the division of functional modules solely for illustrative purposes when implementing its functions. In practical applications, the functions mentioned above can be allocated to different functional modules as needed. In other words, the internal structure of the device may be divided into different functional modules to perform all or part of the functions described above. Additionally, the device embodiments provided above share the same concept as the method embodiments. The specific implementation process can refer to the method embodiments, which will not be repeated here.

Figure 12:
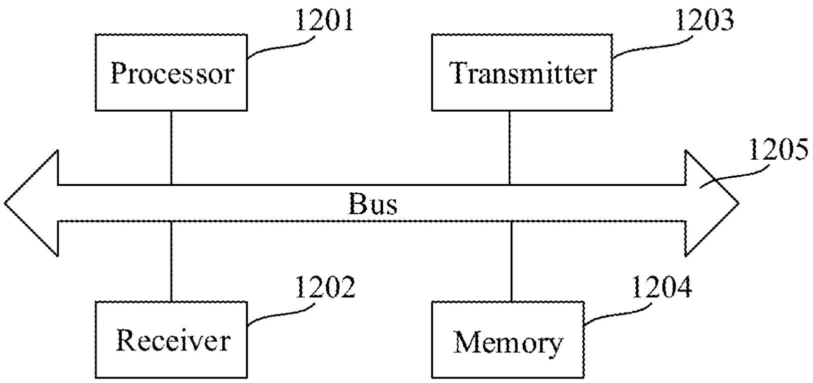
FIG. 12 is a schematic structural diagram of a communication device according to an example of the present disclosure.

FIG. 12 illustrates a schematic structural diagram of a communication device according to an embodiment of the present disclosure. The computer device includes a processor 1201, a receiver 1202, a transmitter 1203, a memory 1204, and a bus 1205.

The processor 1201 includes one or more processing cores, and the processor 1201 executes various functional applications and information processing by running software programs and modules.

The receiver 1202 and the transmitter 1203 may be implemented as a communication component, and the communication component may be a communication chip.

The memory 1204 is connected to the processor 1201 via the bus 1205.

The memory 1204 may be configured to store at least one program code, and the processor 1201 is configured to execute the at least one program code to implement the steps in the method embodiments described above.

In addition, the communication device may be a terminal or a network device. The memory 1204 may be implemented by any type of volatile or nonvolatile storage device or their combinations, and the volatile or nonvolatile storage device includes, but is not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In an example, a non-transitory computer-readable storage medium is further provided. The non-transitory computer-readable storage medium stores executable program codes, where the executable program codes are loaded and executed by a processor, to implement the method for transmitting information executed by the communication device according to the method embodiments described above.

In an example, a chip is provided. The chip includes a programmable logic circuit and/or program instructions, where the chip is configured to implement the method for transmitting information according to the method embodiments described above when run on a terminal or a network device.

In an example, a computer program product is provided. The computer program product is configured to implement the method for transmitting information according to the method embodiments described above when executed by a processor of a terminal or a network device.

In the solution according to the embodiment of the present disclosure, the beam information of the at least one receiving beam is reported to the network device by the terminal, the at least one receiving beam of the terminal is determined by the network device, and the signal quality of the reference signal is determined by the network device according to the at least one receiving beam of the terminal. This can improve the accuracy of the determined signal quality and the reliability of communication.

Those of ordinary skill in the art can understand that all or some steps of the embodiments described above can be completed through hardware or by instructing relevant hardware through a program, the program can be stored in a computer-readable storage medium, and the storage medium described above can be a read-only memory, a magnetic disk or an optical disk, etc.

The embodiments described above are merely preferred embodiments of the present disclosure, which are not intended to limit the present disclosure. Any modification, equivalent replacement, improvement, etc., made within the spirit and principles of the present disclosure should fall within the protection scope of the present disclosure.

The invention claimed is:

1. A method for transmitting information, performed by a network device, comprising:

receiving beam information of at least one receiving beam transmitted by a terminal; and determining signal quality of other reference signals other than at least one reference signal based on signal quality of the at least one reference signal and the beam information of the at least one receiving beam reported by the terminal, wherein the signal quality comprises a layer 1 reference signal received power (L1-RSRP) or a layer 1 signal to interference plus noise ratio (L1-SINR), and wherein determining the signal quality of the other reference signals other than the at least one reference signal based on the signal quality of the at least one reference signal and the beam information of the at least one receiving beam reported by the terminal comprises:

sorting signal quality of the at least one reference signal according to at least one of an identifier of the receiving beam or an identifier of the reference signal, and determining the signal quality of the other reference signals based on the sorted signal quality of the reference signal and a signal quality prediction model; or grouping signal quality of the at least one reference signal according to at least one of an identifier of the receiving beam or an identifier of the reference signal, and determining, based on the grouped signal quality of the reference signal and a signal quality prediction model, signal quality of other reference signals with same beam information as the receiving beam corresponding to the at least one reference signal.

2. The method according to claim 1, wherein the beam information comprises at least one of:
the identifier of the receiving beam,
a value of a first azimuth angle,
an identifier of the first azimuth angle,
a value of a second azimuth angle,
an identifier of the second azimuth angle,
a total number of receiving beams,
a total number of first azimuth angles,
a total number of second azimuth angles,
an identifier of an antenna panel, or
a total number of antenna panels.

3. The method according to claim 2, wherein the identifier of the antenna panel is determined by one of:
using a maximum number of ports supporting a sounding reference signal (SRS); or
using an identifier of an SRS resource.

4. The method according to claim 1, further comprising:
receiving a measurement report of at least one reference signal transmitted by the terminal, and wherein the measurement report comprises at least one of:
an identifier of one or more reference signals,
an L1-RSRP corresponding to the one or more reference signals,
an L1-SINR corresponding to the one or more reference signals, or
beam information of one or more receiving beams corresponding to the one or more reference signals.

5. The method according to claim 4, wherein
the beam information of the one or more receiving beams corresponding to the one or more reference signals comprises at least one of:
the identifier of the receiving beam,
a value of a first azimuth angle,
an identifier of the first azimuth angle,
a value of a second azimuth angle,
an identifier of the second azimuth angle, or an identifier of an antenna panel; and
the measurement report at least comprises pieces of beam information of the receiving beams corresponding to N reference signals, and the pieces of beam information of the receiving beams corresponding to the N reference signals are different, wherein N is a positive integer greater than 1.

6. The method according to claim 1, further comprising:
receiving terminal capability information reported by the terminal, wherein the terminal capability information comprises the beam information of the at least one receiving beam.

7. The method according to claim 6, wherein the beam information comprises at least one of:
a total number of receiving beams,
a total number of first azimuth angles,
a total number of second azimuth angles,
a total number of antenna panels,
a value of a first azimuth angle, or
a value of a second azimuth angle.

8. A non-transitory computer-readable storage medium storing executable program codes, wherein the executable program codes are loaded and executed by a processor, to implement the method for transmitting information according to claim 1.

9. A method for transmitting information, performed by a terminal, comprising:
transmitting beam information of at least one receiving beam to a network device, wherein the network device is configured to determine signal quality of other reference signals other than at least one reference signal based on signal quality of the at least one reference signal and the beam information of the at least one receiving beam reported by the terminal,
wherein the signal quality comprises a layer 1 reference signal received power (L1-RSRP) or a layer 1 signal to interference plus noise ratio (L1-SINR), and
wherein the network device is further configured to:
sort signal quality of the at least one reference signal according to at least one of an identifier of the receiving beam or an identifier of the reference signal, and
determine the signal quality of the other reference signals based on the sorted signal quality of the reference signal and a signal quality prediction model; or
group signal quality of the at least one reference signal according to at least one of an identifier of the receiving beam or an identifier of the reference signal, and
determine, based on the grouped signal quality of the reference signal and a signal quality prediction model, signal quality of other reference signals with same beam information as the receiving beam corresponding to the at least one reference signal.

10. The method according to claim 9, wherein the beam information comprises at least one of:
the identifier of the receiving beam,
a value of a first azimuth angle,
an identifier of the first azimuth angle,
a value of a second azimuth angle,
an identifier of the second azimuth angle,
a total number of receiving beams,
a total number of first azimuth angles,
a total number of second azimuth angles,
an identifier of an antenna panel, or
a total number of antenna panels.

11. The method according to claim 10, wherein the identifier of the antenna panel is determined by one of:
using a maximum number of ports supporting an SRS, or
using an identifier of an SRS resource.

12. The method according to claim 9, further comprising:
transmitting a measurement report of at least one reference signal to the network device, and wherein the measurement report comprises at least one of:
an identifier of the one or more reference signals,
an L1-RSRP corresponding to the one or more reference signals,
an L1-SINR corresponding to the one or more reference signals, or
beam information of one or more receiving beams corresponding to the one or more reference signals.

13. The method according to claim 12, wherein a measurement result comprises at least one of:
the identifier of the one or more reference signals,
the L1-RSRP corresponding to the one or more reference signals,
the L1-SINR corresponding to the one or more reference signals, or
the beam information of the one or more receiving beams corresponding to the one or more reference signals.

14. The method according to claim 13, wherein
the beam information of the one or more receiving beams corresponding to the one or more reference signals comprises at least one of:

the identifier of the receiving beam, a value of a first azimuth angle, an identifier of the first azimuth angle, a value of a second azimuth angle, an identifier of the second azimuth angle, or an identifier of an antenna panel; and the measurement report at least comprises pieces of beam information of the receiving beams corresponding to N reference signals, and the pieces of beam information of the receiving beams corresponding to the N reference signals are different, wherein N is a positive integer greater than 1.

15. The method according to claim 9, further comprising:

transmitting terminal capability information to the network device, wherein the terminal capability information comprises the beam information of the at least one receiving beam.

16. The method according to claim 15, wherein the beam information comprises at least one of:

a total number of receiving beams, a total number of first azimuth angles, a total number of second azimuth angles, a total number of antenna panels, a value of a first azimuth angle, or a value of a second azimuth angle.

17. A terminal, comprising:

a processor; and a transceiver connected to the processor, and wherein the processor is configured to load and execute executable instructions to implement the method for transmitting information according to claim 9.

18. A network device, comprising:

a processor; and a transceiver, connected to the processor, and wherein the processor is configured to load and execute executable instructions to:

receive beam information of at least one receiving beam transmitted by a terminal, determine signal quality of other reference signals other than at least one reference signal based on signal quality of the at least one reference signal and the beam information of the at least one receiving beam reported by the terminal, wherein the signal quality comprises a layer 1 reference signal received power (L1-RSRP) or a layer 1 signal to interference plus noise ratio (L1-SINR), and wherein determining the signal quality of the other reference signals other than the at least one reference signal based on the signal quality of the at least one reference signal and the beam information of the at least one receiving beam reported by the terminal comprises:

sorting signal quality of the at least one reference signal according to at least one of an identifier of the receiving beam or an identifier of the reference signal, and determining the signal quality of the other reference signals based on the sorted signal quality of the reference signal and a signal quality prediction model; or grouping signal quality of the at least one reference signal according to at least one of an identifier of the receiving beam or an identifier of the reference signal, and determining, based on the grouped signal quality of the reference signal and a signal quality prediction model, signal quality of other reference signals with same beam information as the receiving beam corresponding to the at least one reference signal.

* * * * *